US010989360B2

(12) United States Patent
Daniels et al.

(10) Patent No.: US 10,989,360 B2
(45) Date of Patent: Apr. 27, 2021

(54) CHECK VALVE AND ASSEMBLY FOR FLUID STORAGE CONTAINER

(71) Applicant: Chester Valve Corporation, Pittsburgh, PA (US)

(72) Inventors: Mia Daniels, Clinton, PA (US); Kevin Kolonsky, Scenery Hill, PA (US)

(73) Assignee: Chester Valve Corporation, West Alexander, PA (US)

( * ) Notice: Subject to any disclaimer, the term of this patent is extended or adjusted under 35 U.S.C. 154(b) by 101 days.

(21) Appl. No.: 16/235,157

(22) Filed: Dec. 28, 2018

(65) Prior Publication Data

US 2020/0208782 A1    Jul. 2, 2020

(51) Int. Cl.
*F17C 13/02*      (2006.01)
*F16K 31/26*      (2006.01)

(52) U.S. Cl.
CPC .......... *F17C 13/021* (2013.01); *F16K 31/265* (2013.01); *F17C 2201/0109* (2013.01);
(Continued)

(58) Field of Classification Search
CPC ......... Y10T 137/7439; Y10T 137/7478; Y10T 137/7932; Y10T 137/7771;
(Continued)

(56) References Cited

U.S. PATENT DOCUMENTS

| | | | | |
|---|---|---|---|---|
| 1,764,181 A | * | 6/1930 | Raetz | F04F 5/461 |
| | | | | 417/192 |
| 1,785,271 A | * | 12/1930 | Lemex | E21B 21/10 |
| | | | | 137/515.5 |

(Continued)

FOREIGN PATENT DOCUMENTS

| | | |
|---|---|---|
| CA | 02204460 | 5/1997 |
| CN | 104613199 A | 5/2015 |
| GB | 1170878 | 11/1969 |

OTHER PUBLICATIONS

International Searching Authority; International Search Report and Written Opinion of the International Searching Authority; International Application No. PCT/US19/68526; Patent Cooperation Treaty; pp. 1-15; publisher United States International Searching Authority; Published Alexandria, Virginia, US; copyright and dated Mar. 24, 2020; copy enclosed (15 pages).

*Primary Examiner* — Marina A Tietjen
*Assistant Examiner* — Frederick D Soski
(74) *Attorney, Agent, or Firm* — Metz Lewis Brodman Must O'Keefe LLC

(57) ABSTRACT

A check valve assembly includes a valve, cam and arm with float rotatably connected to the valve for insertion into a fluid storage container for filling of the container without overfilling. The valve includes a channel of narrowing diameter and restricting member movably retained within the channel. One end of the restricting member rides along the cam profile as the arm rotates the cam with the changing fluid levels. When the fluid reaches maximum fill level, the restricting member contacting the cam drops into the cam valley, driving the restricting member head into engagement with the channel neck walls and automatically sealing off the valve. First and second biasing members are disposed in the channel, preferably around the stem, and collectively provide counter force sufficient to overcome the frictional forces of the seal to open valve and move the restricting member upward.

21 Claims, 8 Drawing Sheets

(52) U.S. Cl.
CPC ............. *F17C 2205/0311* (2013.01); *F17C 2205/0323* (2013.01); *F17C 2205/0382* (2013.01); *F17C 2205/0394* (2013.01); *F17C 2221/035* (2013.01); *F17C 2223/033* (2013.01); *F17C 2250/0413* (2013.01); *F17C 2260/022* (2013.01); *Y10T 137/7771* (2015.04); *Y10T 137/7869* (2015.04); *Y10T 137/7932* (2015.04)

(58) Field of Classification Search
CPC ............. Y10T 137/7869; F17C 13/021; F17C 2201/0109; F17C 2205/0311; F17C 2205/0323; F17C 2206/0382; F17C 2205/0394; F17C 2221/035; F17C 2223/033; F17C 2260/0413; F17C 2260/022; F16K 31/265
See application file for complete search history.

(56) References Cited

U.S. PATENT DOCUMENTS

| | | | |
|---|---|---|---|
| 2,504,638 A * | 4/1950 | Browning | F16K 31/265 137/420 |
| 2,716,424 A * | 8/1955 | Watts | F16K 11/10 137/512 |
| 2,744,727 A * | 5/1956 | Osburn | E21B 21/10 137/454.2 |
| 2,771,091 A * | 11/1956 | Baker | E21B 21/10 137/542 |
| 2,917,077 A * | 12/1959 | Ziege | F16K 47/023 137/514.7 |
| 2,919,655 A * | 1/1960 | Poettmann | E21B 43/122 417/115 |
| 3,397,577 A * | 8/1968 | Siebert | F17C 13/021 73/309 |
| 3,741,249 A | 6/1973 | Leutwyler | |
| 3,756,273 A * | 9/1973 | Hengesbach | F16K 15/026 137/540 |
| 4,064,907 A | 12/1977 | Billington et al. | |
| 4,142,552 A | 3/1979 | Brown et al. | |
| RE30,427 E * | 11/1980 | Brown | F16K 21/18 137/446 |
| 4,258,925 A | 3/1981 | Guyton | |
| 4,305,422 A * | 12/1981 | Bannink | F17C 5/02 137/415 |
| 4,371,000 A * | 2/1983 | Shinoda | F02M 5/02 137/434 |
| 4,462,417 A * | 7/1984 | Trinkwalder, Jr. | F16K 17/36 137/389 |
| 4,483,367 A | 11/1984 | Ross, Jr. et al. | |
| 4,495,960 A | 1/1985 | Cartier et al. | |
| 4,601,311 A * | 7/1986 | Acker | F15B 13/0402 137/625.25 |
| 4,665,943 A | 5/1987 | Medvick et al. | |
| 4,932,435 A * | 6/1990 | Stroze | F16K 17/28 137/504 |
| 4,958,657 A * | 9/1990 | Hagan | F16K 17/30 137/513.5 |
| 5,234,019 A * | 8/1993 | Forner | F16K 21/18 137/410 |
| 5,282,496 A | 2/1994 | Kerger | |
| 5,294,917 A * | 3/1994 | Wilkins | G01F 25/0076 200/84 C |
| 5,413,153 A | 5/1995 | Zwilling et al. | |
| 5,460,197 A * | 10/1995 | Kerger | F16K 1/305 137/389 |
| 5,472,012 A | 12/1995 | Wood et al. | |
| 5,487,404 A | 1/1996 | Kerger | |
| 5,490,680 A | 2/1996 | Patel et al. | |
| 5,613,518 A * | 3/1997 | Rakieski | F16K 17/30 137/513.5 |
| 5,842,500 A * | 12/1998 | Rockwood | F16K 1/302 137/413 |
| 5,865,603 A * | 2/1999 | Francart, Jr. | F16K 31/265 417/133 |
| 5,921,272 A | 7/1999 | Cavagna | |
| 6,026,841 A * | 2/2000 | Kozik | F16K 31/26 137/202 |
| 6,076,546 A | 6/2000 | Waters | |
| 6,079,438 A | 6/2000 | Cavagna | |
| 6,138,709 A | 10/2000 | Home | |
| 6,178,994 B1 | 1/2001 | Park | |
| 6,227,233 B1 * | 5/2001 | Kozik | F16K 1/307 137/202 |
| 6,293,302 B1 | 9/2001 | Waters et al. | |
| 6,640,829 B1 | 11/2003 | Kerger | |
| 6,810,905 B1 | 11/2004 | Watson et al. | |
| 6,910,499 B2 | 6/2005 | Chan | |
| 7,219,686 B2 | 5/2007 | Schmitz et al. | |
| 7,240,690 B2 | 7/2007 | Schmitz et al. | |
| 7,296,594 B1 * | 11/2007 | Phanco | F16H 61/4017 137/512.2 |
| 7,487,793 B2 | 2/2009 | Schmitz et al. | |
| 7,748,402 B2 | 7/2010 | Chan | |
| 7,779,858 B2 | 8/2010 | Schmitz et al. | |
| 7,967,025 B2 | 6/2011 | Kidprasert | |
| 8,256,451 B2 | 9/2012 | Frederiksen | |
| 8,550,111 B2 | 10/2013 | Home | |
| 8,561,638 B2 | 10/2013 | Yamaguchi | |
| 2006/0090795 A1 * | 5/2006 | Chan | F16K 1/303 137/446 |
| 2006/0112992 A1 * | 6/2006 | Schmitz | F16K 1/307 137/413 |
| 2006/0169325 A1 * | 8/2006 | Schmitz | F16K 21/18 137/413 |
| 2007/0089793 A1 * | 4/2007 | Allegretti | F15B 13/0422 137/636.1 |
| 2008/0078467 A1 * | 4/2008 | Home | F16K 1/305 141/95 |
| 2008/0115842 A1 * | 5/2008 | Watson | F16K 17/046 137/504 |
| 2010/0024917 A1 * | 2/2010 | Frederiksen | F16K 31/26 141/198 |
| 2010/0024918 A1 * | 2/2010 | Frederiksen | F16K 31/265 141/198 |
| 2011/0108159 A1 * | 5/2011 | Grote | F17C 7/02 141/4 |
| 2011/0197994 A1 * | 8/2011 | Home | F16K 33/00 141/198 |
| 2011/0297262 A1 * | 12/2011 | Jubert | F16K 11/07 137/625 |
| 2014/0083519 A1 * | 3/2014 | Fan | G05D 7/0106 137/15.18 |
| 2017/0130863 A1 * | 5/2017 | Chang | F17C 13/04 |
| 2017/0159834 A1 * | 6/2017 | Jeon | B60T 8/341 |
| 2018/0239375 A1 | 8/2018 | Heiderman et al. | |
| 2019/0178399 A1 | 6/2019 | Takeda et al. | |

* cited by examiner

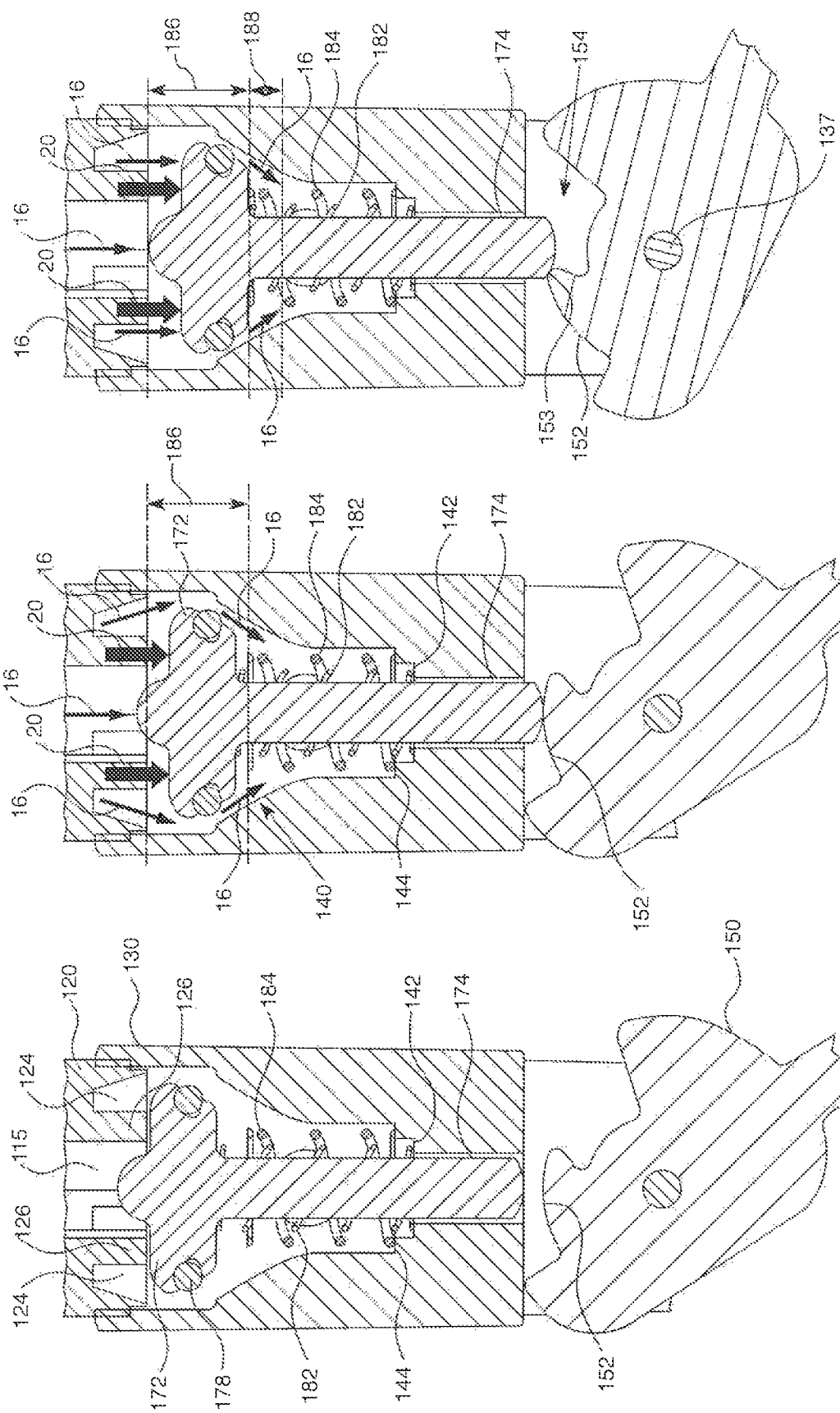

CHECK VALVE AND ASSEMBLY FOR FLUID STORAGE CONTAINER

FIELD OF THE INVENTION

This invention relates to check valves, and more particularly, to valves that prevent the overfilling of containers with fluid.

BACKGROUND

Propane canisters are commonly used for residential and commercial purposes, mostly in connection with propane powered grills and heating devices. The gas is typically stored in a generally oblong metal container which has a threaded valve positioned in the single orifice at the top. In the United States, by law, each valve must be provided with an overfill check valve, which prevents overfilling of the container by inattentive or careless personnel. The propane is charged as a liquid through the threaded valve and a float-based check is provided internally within the container, similar to a toilet.

As the tank is filled or charged, the float rises. A variety of methods are used to block the flow of liquid once the tank is filled and the float has reached its upper limit of travel. Common examples include simple check balls which are raised from a ball seat by a cam affixed to a pivotable float to permit flow and wedge against the seat when the cam is rotated. Other designs utilize pistons rather than a ball, with a similar overall function.

For instance, the cam typically has a stepped configuration with a valley defined lower than an extension or curved part, which may have a corner or angled wall at the edge of the valley. The extension often supports a piston of the valve in an elevated (open) position during filling, allowing fuel to enter the tank. As the float rises, the cam is rotated. When the float reaches the upper limit of travel, the cam is rotated such that the cam extension moves away from the piston and the cam valley is now aligned therewith. As the cam extension moves away, the piston slips off the cam and into the cam valley by gravity and may further be urged downward into the cam valley by the pressure of the flowing fluid. In some check valves, a spring biases the piston toward the open position and the pressure of the fluid is sufficient to overcome this biasing force when the cam extension is no longer supporting the piston. In other examples, a spring biases the piston toward a closed position and removal of the cam extension from its supporting position releases the tension on the spring and urges the piston toward the closed position. In still other examples, the piston is free-floating within the valve and pressure differentials above and below the piston may be used to control between the open and closed positions.

One significant shortcoming of existing piston and cam designs is the frictional engagement of the lower end of the piston with the cam profile and/or other parts of the valve that provide sealing of the valve. For instance, as the gas in the tank is consumed, the cam lobe adjacent the cam valley may bind on the end of the piston rod. This may inhibit the ability of the piston to return to its uppermost position, even against the bias of the spring. One known design includes a movable section of the cam (such as a finger) to raise the piston out of the cam valley as the cam rotates away from the upper limit of travel. Many known designs utilize pressure differentials above and below a free floating biased piston to retard flow. However, all of these known designs still struggle with overcome frictional forces which can lead to reduced effectiveness, slow responsiveness of the valve, or completely inhibit fluid flow.

Canadian patent application CA 02204460 discloses an overfill protection device for filling a gas tank. The overfill device has a cylindrical piston fitted in tubular bodies having a neck defined between an upper portion and a lower portion of smaller diameter. An O-ring is fitted in the neck. As gas enters the tank, it pushes the piston downwardly and the stem of the piston rides along a rotating cam connected to an arm with attached float. When the pressure within the tank reaches a predetermined level, the cam is rotated to align a concave portion of the cam with the piston, allowing the piston to be pushed onto the neck where it is sealed by the O-ring, thus preventing further gas flow. However, CA 02204460 is silent regarding the frictional forces involved in the sealed position or overcoming them.

U.S. Pat. No. 5,282,496 discloses a two-way valve permitting filling and draining of a gas cylinder. The valve includes a piston, cam, arm, and float as previously described. It also discloses a spring biasing the piston toward an open position where the head is held in a leaktight seal against a shell until gas is introduced, pushing the piston downwardly toward the cam. The '496 patent discloses a pendulum that tilts when the cylinder is tilted, obstructing the fluid flow path and preventing filling of the cylinder except when it is upright. It does not address the frictional forces of the seal or closed position.

U.S. Pat. No. 5,472,012 discloses a shut-off valve for a storage tank having a cam that rotates in response to the level of liquid in the tank. The valve is a poppet valve that moves axially within a housing with the movement of the cam rotation. One spring is disposed about the check ball retainer sleeve of the valve, and a second spring is disposed within the sleeve, both to urge the ball toward an open position. During filling, the springs are compressed, providing increasing force against the check ball with the increased fluid pressure. When the fluid reaches a predetermined level, the valve is moved into a seated position by the force of the fluid pressure. However, no mention of the frictional forces of the seated position are addressed.

U.S. Pat. No. 5,413,153 discloses a cam-driven machine for filling a container having a valve and a gas pipe for conveying gas for filling. The valve is closed by default, with a first spring biasing the gas pipe into a closed position. A second spring is also present which, when compressed by the cam, pushes against the gas pipe with enough force to overcome the biasing force of the first spring and opening the valve so gas may flow. Further rotation of the cam releases pressure on the second spring, allowing the first spring to bias the gas pipe back to the closed position. Friction is not addressed, since the cam position determines whether the valve is opened or closed, which is independent of how much fluid is in the container being filled.

Therefore, it would be beneficial to have a check valve which would not only prevent accidental overflow during filling or charging of a holding vessel but would also be able to easily overcome the frictional forces involved in maintaining a sealed or closed valve, such as may be exerted against a piston of a valve.

SUMMARY

A check valve assembly is disclosed which can be used in a propane tank or canister, or other fluid holding vessel, to charge or fill the container with a fluid. The fluid may be, but is not limited to propane, natural gas, butane, or other gaseous or liquid fluid. The check valve assembly includes a valve which prevents the accidental overfilling of the fluid by automatically closing the valve when a predetermined fill level is achieved. The valve includes a dual-force mechanism to overcome the frictional forces on the restricting member forming the seal and allow quick and efficient release of the restricting member to open the valve when desired.

The check valve assembly includes a valve rotatably connected to a cam. An arm with float extends from the cam, which rises and falls with the fluid level in a container in which the check valve assembly is installed. The cam has a cam profile defining a cam lobe and valley. When the float has risen to a predetermined maximum fill level, the arm has sufficiently rotated the cam to a position where at least a portion of the restricting member within the valve falls within the cam valley and the restricting member forms a seal within the channel of the valve, thus closing the valve. In at least one embodiment, the restricting member is a piston with a head and stem extending therefrom. The piston stem rides along the cam during rotation and drops into the cam valley when the predetermined maximum fill level is reached, and the head forms a seal with the channel, thus closing the valve.

The valve includes a channel having a non-uniform diameter such that it narrows at a neck. The neck may therefore be defined by angled wall(s). The valve also includes a fluid opening(s) in fluid communication with the channel, permitting egress and ingress of fluid to the valve and allowing the container to be filled and emptied through the valve. The fluid opening(s) are located downstream of the sealing point of the valve, such as may be located in the neck in at least one embodiment, to prevent fluid leakage. The valve may further include an annular channel and/or passage(s) disposed about and in fluid communication with the central channel and providing fluid to the outer perimetric areas of the valve.

A restricting member is movably retained within channel of the valve and frictionally engages the walls of the neck of the channel to close the valve and prevent further fluid flow when the maximum fill level is achieved. The restricting member may be a piston, ball, or other similar component of any type of valve.

The valve further includes at least one, but preferably first and second biasing members providing different force components or levels of resistive force against the restricting member when compressed. In at least one embodiment, the first and second biasing members are disposed concentrically about one another in the channel and may be concentric about the restrictive member such as piston stem, though other configurations are also possible. The biasing members are compressed in various compression zones by the restricting member as a result of fluid flow into the valve during filling. In a first compression zone, the biasing member(s) provide a first resistive force which is sufficient to continue further compression. In the second compression zone, a second force component is added to the first force component. This second force component may be greater than the first force component. The first and second biasing members may be of different lengths and provide the first and second force components, so that the compression zones are defined at least in part by the heights and compressive ranges of the biasing members. For example, the first compression zone may occur when the first biasing member is being compressed and providing a first force component. The second compression zone may occur when the restricting member is closer to the walls of the channel, making the fluid flow path narrower and increasing the pressure of fluid flow. This allows for compression of the second biasing member which may provide a second and possibly greater force component that adds to that of the first force component. This additional and possibly greater resistive force is needed to overcome the frictional force of this stronger seal when opening the valve is permitted, and contributes to closure of the valve by sealing the restricting member against the channel.

The check valve and assembly, together with its particular features and advantages, will become more apparent from the following detailed description and with reference to the appended drawings.

DESCRIPTION OF THE DRAWINGS

FIG. 13 is a detail cross-sectional view of the valve of the check valve assembly in an open resting position, shown along line 13-13 of FIG. 3.

FIG. 14 is a detail cross-sectional view of the valve in an open filling position and showing a first compression zone.

FIG. 15 is a detail cross-sectional view of the valve in a transition position showing the compression zones.

Like reference numerals refer to like parts throughout the several views of the drawings.

DETAILED DESCRIPTION

Figure 1:
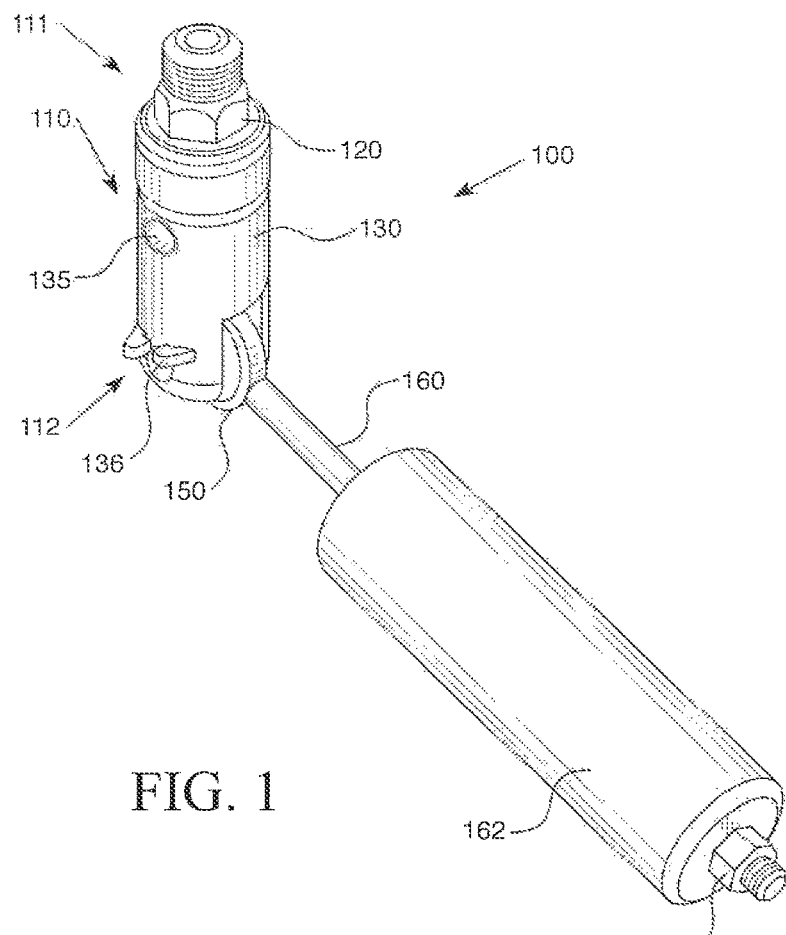
FIG. 1 is an isometric view of the check valve assembly of the present invention.
Figure 3:
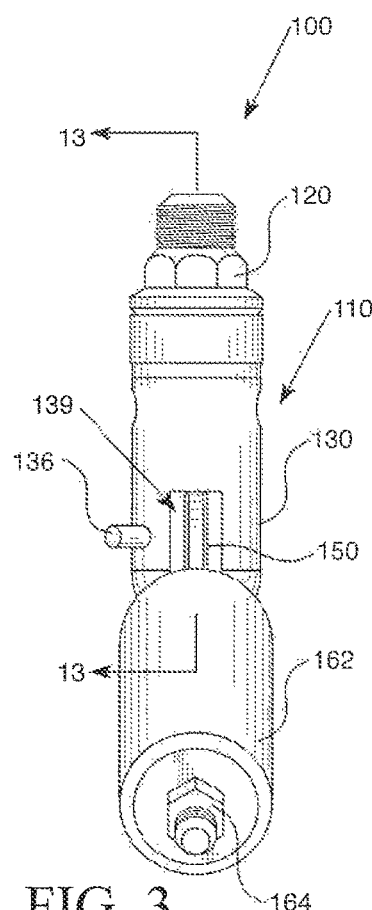
FIG. 3 is a side elevation view of the check valve assembly of FIG. 1 viewed along the arm axis.
Figure 2:
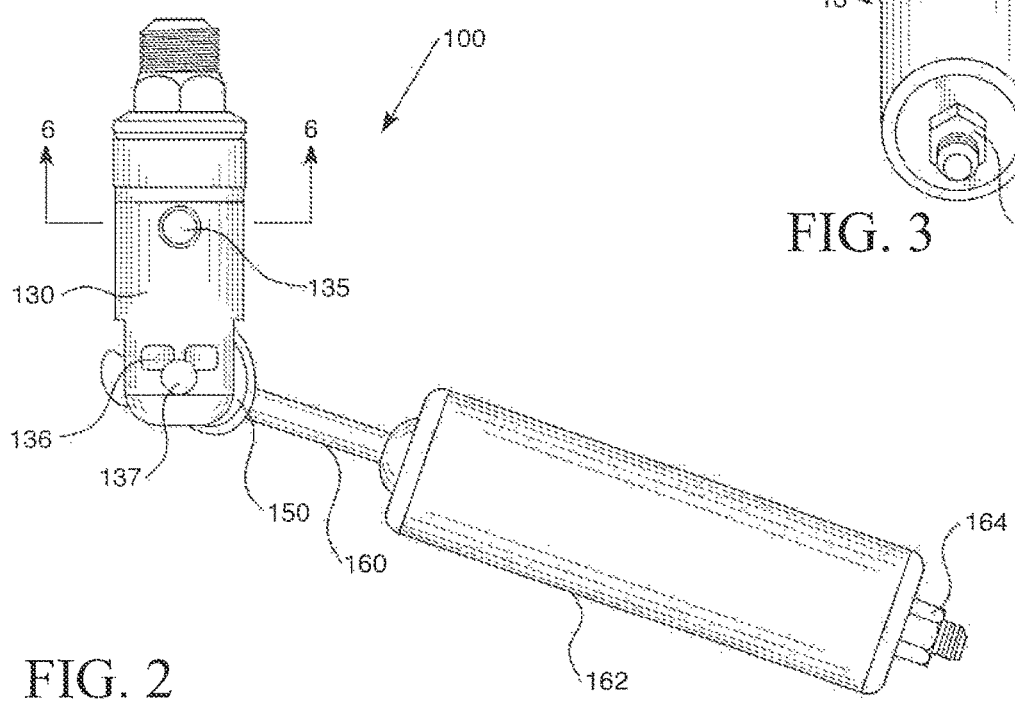
FIG. 2 is a front elevation view of the check valve assembly of FIG. 1 viewed along the valve axis.

As shown in the accompanying drawings, the present invention is directed to a check valve and assembly for use in fluid storage containers to prevent overfilling. The check valve assembly therefore includes a mechanism enabling automatic shut-off and sealing of the valve to prevent further fluid passage when a predetermined fluid limit is reached in the container.

With reference to FIGS. 1-4, the check valve assembly 100 includes a valve 110 having a length defined by a valve axis 114, and a first end 111 and opposite second end 112 disposed along the valve axis 114. The length of the valve 100 may be any suitable dimension, such as but not limited to in the range of 50-70 mm, and about 60 mm in at least one embodiment. The valve 110 may have any diameter as would permit the flow of fluid therethrough, such as in the range of 10-30 mm, and preferably about 18.7 mm in one embodiment. The valve 110 may be made of any suitable material, such as but not limited to nylon, plastics, metals and metal alloys.

Figure 5:
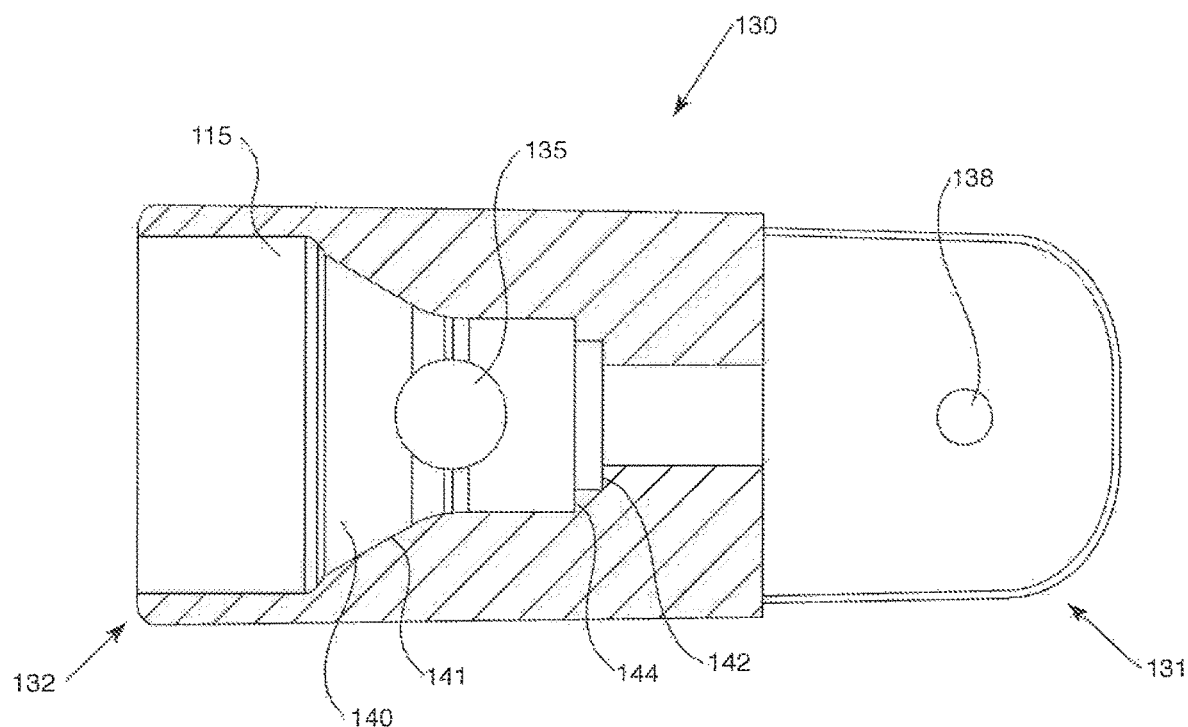
FIG. 5 is a cross-sectional view of the lower body of the valve shown along the valve axis.
Figure 11:
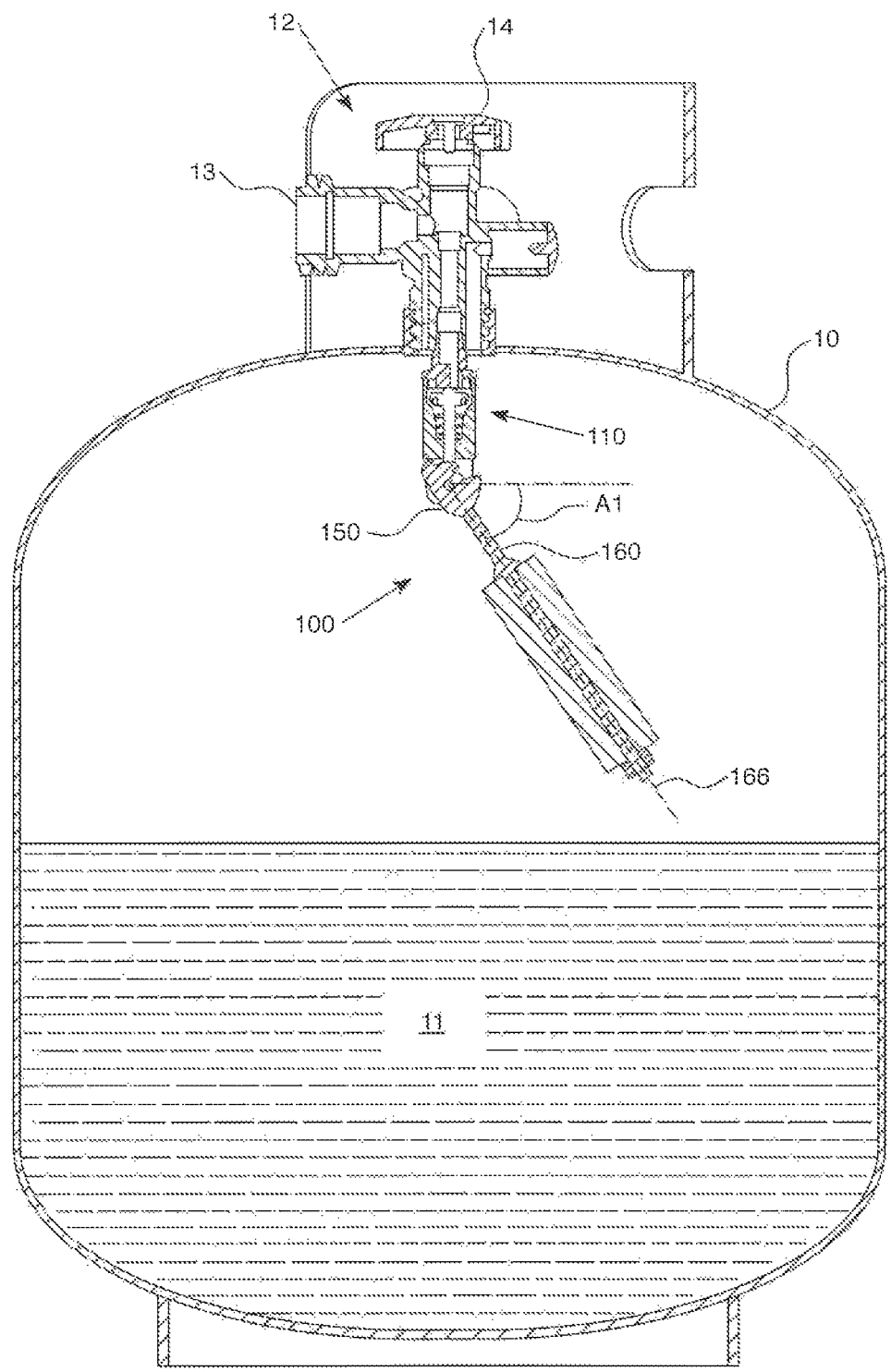
FIG. 11 is a diagram of the check valve assembly installed in a fluid storage container, showing the check valve assembly in an open position.
Figure 12:
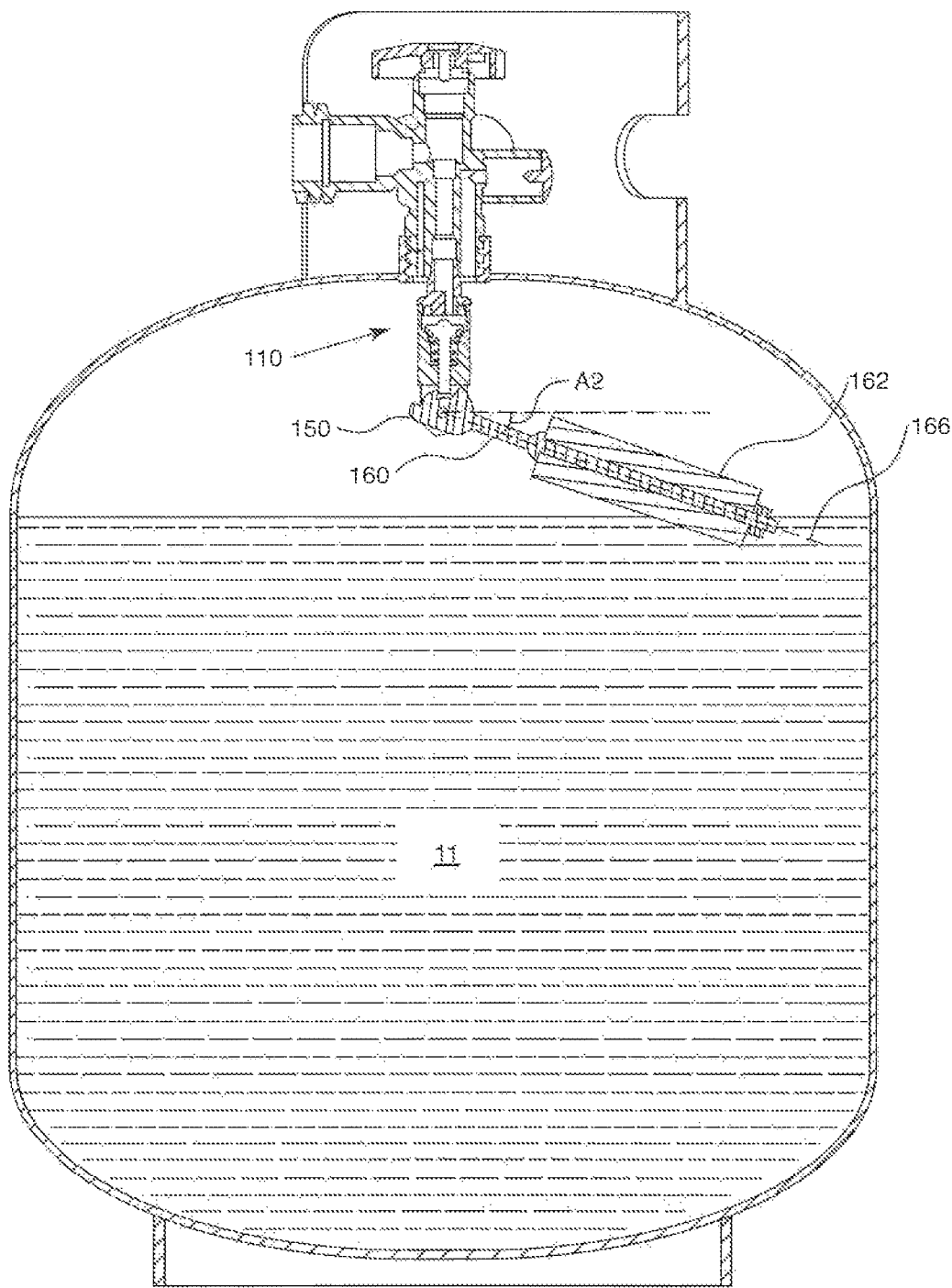
FIG. 12 a diagram of the check valve assembly installed in a fluid storage container, showing the check valve assembly in the closed position.
Figure 17:
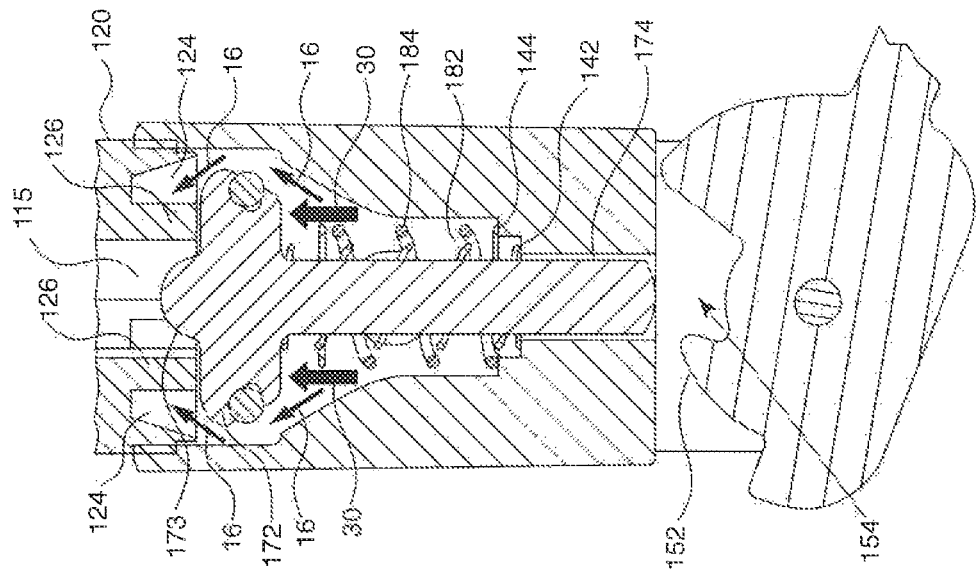
FIG. 17 is a detail cross-sectional view of the valve in an open position showing the initial discharge after filling.

The valve 110 includes a channel 115, shown in FIG. 5, extending therethrough along the valve axis 114 between the first and second ends 111, 112 through which fluid 11 may flow, as in FIGS. 11 and 12. The interior wall(s) of the valve 110 define the channel 115. The valve 110 may be used to transfer fluid 11, such as propane, butane, natural gas, or the like, and which may be in the liquid or gaseous form during filling, storage, or discharge. The channel 115 is therefore selectively in fluid communication with a fluid source when the valve 110 is connected thereto. The channel 115 also has a diameter sufficient to permit fluid flow therethrough and may vary in diameter along its length.

The valve 110 is composed of an upper body 120 located at the first end 111 and a lower body 130 located at the second end 112 which fit together. Referring to FIGS. 1-6, the lower body 130 includes a first end 131, an opposite second end 132, and a portion of the channel 115 extending therethrough between the second and first ends 132, 131. The lower body 130 may have approximately the same diameter as the rest of the valve 110. For instance, the lower body 130 may have a diameter in the range of about 15-20 mm and may be about 18 mm in at least one embodiment. The lower body 130 also has a length defined along the valve axis 114 between the first and second ends 131, 132. The lower body 130 may have any suitable length that is less than the overall length of the valve 110 and may in certain embodiments be about ¾ the total length of the valve 110. For instance, the lower body 130 may have a length in the range of about 35 to 55 mm and may be about 44 mm in at least one embodiment. The lower body 130 may be formed of any material suitable for conducting the intended fluid, such as those identified above for the valve 110.

Figure 6:
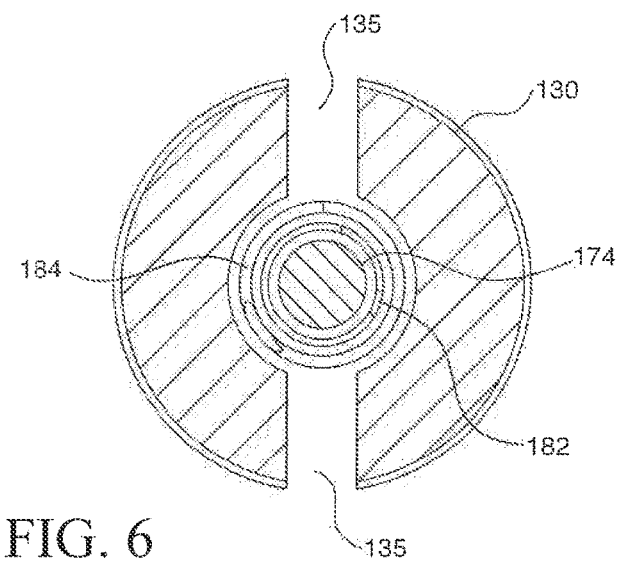
FIG. 6 is a top cross-sectional view of the valve of FIG. 2 shown along line 6-6, showing a piston as restricting member and biasing members in the lower body of the valve.
Figure 16:
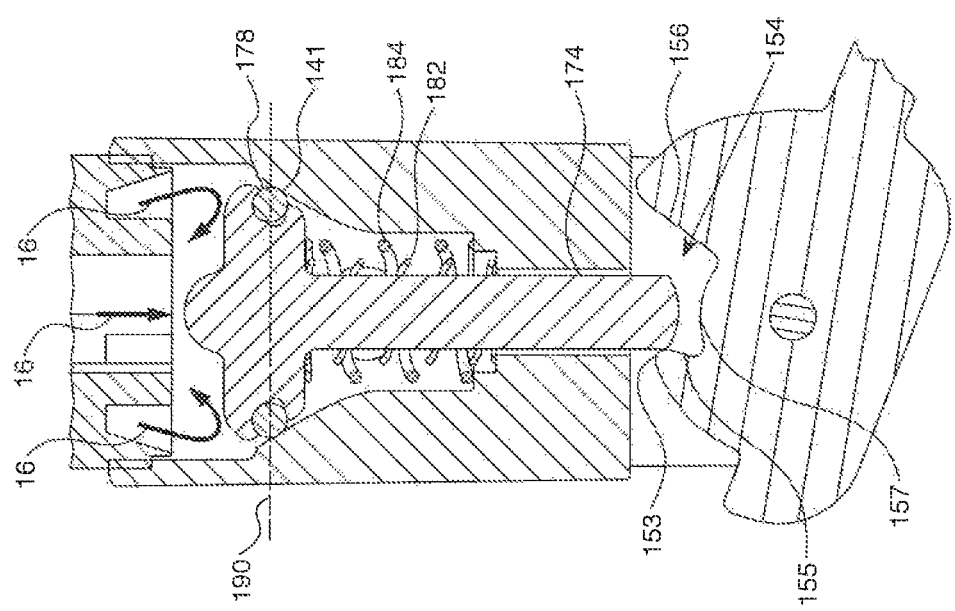
FIG. 16 is a detail cross-sectional view of the valve in a closed position showing the sealing point.

At least one fluid opening 135 is formed in the valve 110, such as in the lower body 130, though it may be formed in any part of the valve 110 downstream of where the seal is formed in the closed position, the sealing point 190, to avoid leaking of the valve 110. The fluid opening(s) 135 provides an outlet for the fluid 11 from the valve 110 during filling, and an inlet to the valve 110 during discharge. As best shown in FIGS. 5, 6 and 16, the fluid opening(s) 135 may be formed in the lower body 130 anywhere along the length thereof downstream of the sealing point 190, such as in the walls of the lower body 130 and extends in fluid flow communication between the channel 115 inside the valve 110 and the exterior of the valve 110. In at least one embodiment, the fluid opening(s) 135 may be formed in the lower body 130 about ⅓ the distance to one of the ends 131, 132 thereof, such as the second end 132 shown in the embodiment of FIG. 5. The fluid opening(s) 135 may be formed at any angle relative to the channel 115, such as perpendicularly as shown in FIGS. 5-6, or at any oblique angle. Accordingly, fluid flow through the fluid opening(s) 135 may be transverse to fluid flow through the channel 115. In some embodiments, the fluid opening(s) 135 may be located at the terminal end of the first end 131 of the lower body 130, in which the fluid opening(s) 135 may be parallel with the channel 115. There may be any number of fluid openings 135, which may be disposed at regular or irregular intervals from one another along and/or circumferentially around the valve 110. For instance, in at least one embodiment, the fluid openings 135 may be formed opposite from one another, as in FIG. 6. The various fluid openings 135 may have any diameter sufficient to permit fluid flow therethrough, such as in the range of about 1-10 mm, and preferably about 5 mm in at least one embodiment. In at least one embodiment, the fluid opening (s) 135 may have a diameter less than that of the channel 115 at the point at which the fluid opening(s) 135 and channel 115 intersect, though in other embodiments the fluid opening 135 diameters may be equal to that of the channel 115 at such point. Further, the various fluid openings 135 may have the same or different diameters from one another and may have any shape such as but not limited to circular, oblong, ovoid, rectangular, square, and hexagonal.

As shown in FIG. 5, the channel 115 may have a diameter that varies over its length through the lower body 130. For instance, the channel 115 may have a diameter in the range of about 4-20 mm. In at least one embodiment, the channel 115 may have a diameter of about 16 mm at a first location such as at the second end 132 of the lower body 130, about 8.5 mm at an intermediate location, and about 4.4 mm at a third location such as at the first end 131 of the lower body 130. Accordingly, the channel 115 may be described as narrowing or tapering in diameter from the second end 132 to the first end 131. In other embodiments, however, the channel 115 may widen from second end 132 to the first end 131. The channel 115 includes a neck 140 where the wall(s) 141 of the channel 115 angle to change the diameter of the channel 115. In the embodiment of FIG. 5, the neck 140 narrows from the second end 132 to the first end 131, with the wall(s) 141 thereof angling toward the valve axis 114. The angle or pitch of the wall(s) 141 at the neck 140 may be any angle suitable to transition between diameters of the channel 115 along an incline, such as but not limited to in the range of 10° to 80°. In at least one embodiment, the incline of the walls 141 at the neck 140 may be about 30°, as shown in FIG. 5. The neck 140 may be located anywhere along the length of the channel 115. In at least one embodiment as depicted in FIG. 5, the neck 140 may be located closer to the second end 132 of the lower body 130 than the first end 131, and preferably upstream of the fluid opening(s) 135.

The channel 115 may also vary in diameter by steps, wherein certain portions of the walls may be formed at right angles to the valve axis 114 to rapidly affect the diameter of the channel 115. In some embodiments, there may be at least one or more than one such stepped walls. As shown in FIG. 5, these steps or perpendicular portions of walls may form a first support surface 142 and second support surface 144, each further varying the diameter of the channel 115. For instance, the second support surface 144 may decrease the diameter of the channel 115 from the diameter at the base of the neck 140 to a smaller diameter, and the first support surface 142 may still further decrease the diameter. Accordingly, the first support surface 142 may have a smaller diameter than the second support surface 144, which may have a smaller diameter than the remainder of the channel 115. In at least one embodiment, the second support surface 144 may have a diameter of about 8.5 mm and the first support surface 142 may have a diameter of about 6.5 mm. Of course, other dimensions and diameters of the first and second support surfaces 142, 144 are also contemplated herein, and are limited only by the size of the valve 110 and the channel 115. In other embodiments, the walls may increase the diameter of the channel 115.

The first and second support surfaces 142, 144 may have the same radial length or different radial lengths from one another. For instance, in at least one embodiment, the first and second support surfaces 142, 144 may each have a radial length in the range of 1-2 mm. Further, the first and second support surfaces 142, 144 may be located anywhere along the length of the channel 115. In at least one embodiment, the first and second support surfaces 142, 144 may be formed near the first end 131 of the lower body 130, with the channel 115 continuing along the valve axis 114 beyond the first and second support surfaces 142, 144, as in FIG. 5. In other embodiments, the first and second support surfaces 142, 144 may be formed at a terminal end of the channel 115 at the first end 131 thereof. Further, the first and second support surfaces 142, 144 may have any longitudinal height, in the direction of the valve axis 114, limited by the size of the valve 110 and the channel 115. The longitudinal heights of the first and second support surfaces 142, 144 may be the same or different from one another, and may depend on the specifications of the biasing member(s) 182, 184 which they are intended to support and the amount of space for compression before the valve 110 closes and seals.

Figure 4:
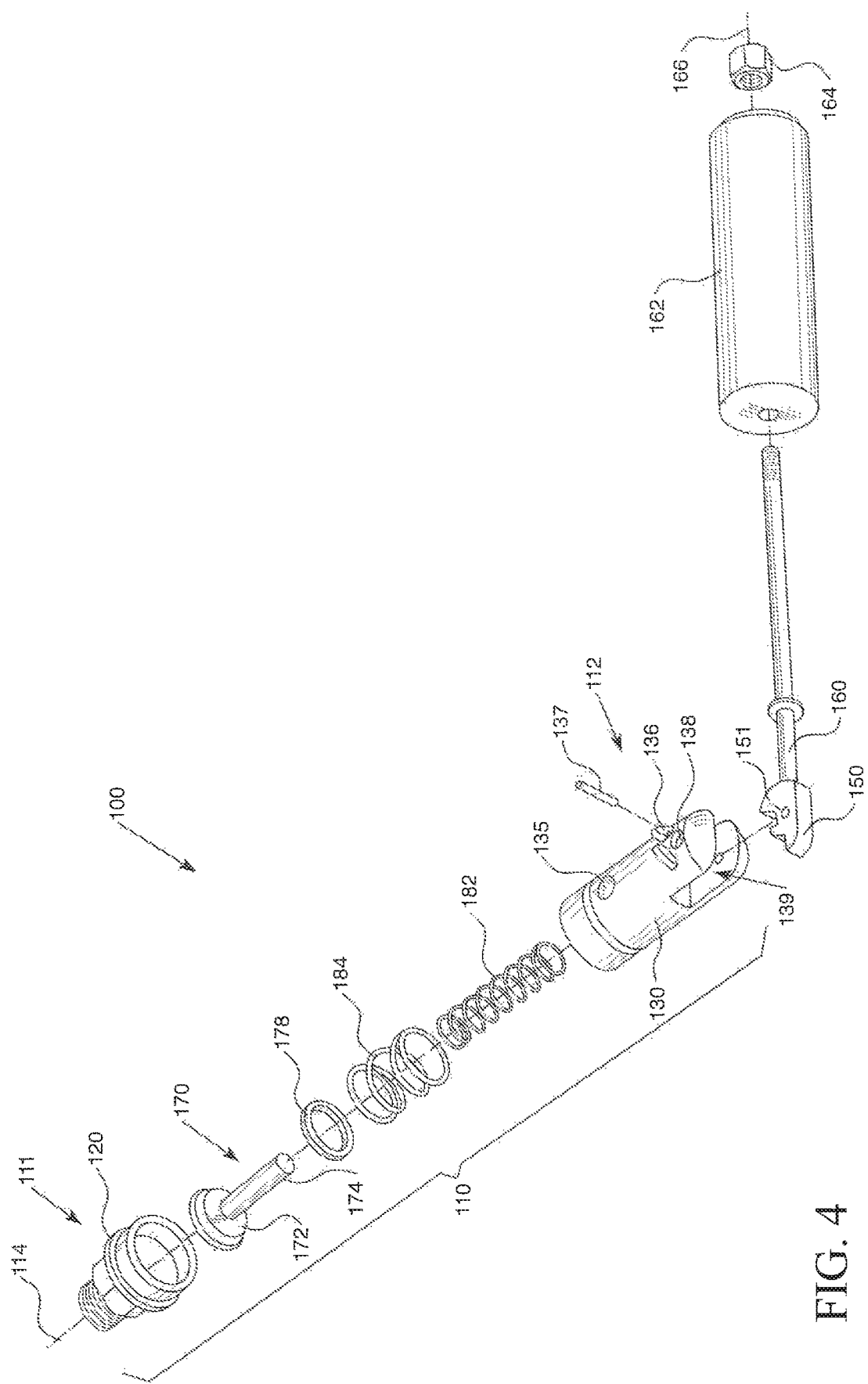
FIG. 4 is an exploded view of the check valve assembly of FIG. 1 showing both the valve and arm axes.

The valve 110 further includes at least one biasing member, preferably a first biasing member 182 and second biasing member 184 positioned and configured to selectively engage the support surface(s) 142, 144 and a restricting member 170 when compressed. The biasing member(s) 182, 184 may be positioned anywhere in the valve 110. In at least one embodiment, they may be located within the channel 115 of the lower body 130, preferably along the valve axis 114, as shown in FIGS. 4 and 6. This is but one example and is not meant to be limiting. The biasing member(s) 182, 184 are compressible but also sufficiently resilient to return to an uncompressed state when no longer under pressure. For example, in at least one embodiment the biasing member(s) 182, 184 may be springs, though it is contemplated they may have any structure, such as but not limited to coiled springs, leaf springs and tensile arms.

The biasing members 182, 184 may have the same or different physical characteristics as one another relating to compressibility and resiliency. Examples include but are not limited to spring rates, force strengths, length, and number of coils. In some embodiments, there may be a single biasing member 182 having differing physical characteristics or properties in different areas thereof, such as to provide differing resistive force components depending on which area(s) is being compressed. The biasing members 182, 184 may be made of the same material as one another, such as but not limited to stainless steel, alloy steel, high-carbon steel, other metals, and plastics. In certain embodiments, the biasing members 182, 184 may be made of different materials from one another. Similarly, a single composite biasing member may be made of different materials along different areas thereof.

As a result of their various physical characteristics or properties, the biasing member(s) 182, 184 each provide a force component when compressed. For instance, a first biasing member 182 produces a first force component, and a second biasing member 184 produces a second force component. In the case of a single biasing member, different areas thereof may provide first and second force components. Each of these force components is the force with which the biasing member(s) 182, 184 pushes back against the compressive force, such as a spring force in the case of coiled springs. The force components may also be ranges of forces, such as when increasing compression produces increasing resistive forces in the biasing member. Accordingly, in at least one embodiment, the first force component may be a first range of resistive forces, and the second force component may be a second range of resistive forces. These first and second ranges of forces may overlap with one another or may be distinct from one another, depending on the properties of the biasing member(s) 182, 184 producing them and the amount of compression being applied.

The particular amount of force of the first and second force components, or ranges thereof, will depend on the physical properties of the biasing members 182, 184 relating to compressibility and resiliency, such as but not limited to elasticity, spring rate, force strength, length, and number of coils. For instance, the first and second biasing members 182, 184 may have the same or different spring rates, such as the first biasing member 182 having a lower spring rate than the second biasing member 184 or vice versa. For instance, in at least one embodiment the first biasing member 182 may have a spring rate in the range of 0.05-2.0 N/mm and may be about 0.08 N/mm in at least one embodiment. The second biasing member 184 may have a spring rate in the range of 1.0-3.0 N/mm and may be about 1.2 N/mm in at least one embodiment. The spring rate may be a function of at least one of the material, number of coils, overall diameter, and wire diameter of the biasing member. In still further embodiments, there may be a single biasing member 182 having different properties throughout its length, such as a composite spring made of different materials or with different stiffness and compressibility in different areas. These different properties may provide differing spring rates in different areas of the biasing member 182, which in turn creates different force components when compressed.

The biasing member(s) 182, 184 may be located anywhere in the valve 110. In at least one embodiment, they are positioned adjacent to one another within the channel 115, such as end-on-end or concentrically about one another as shown in FIG. 6, though in other embodiments they may be positioned in other relationships such as but not limited to parallel to one another. In at least one embodiment, the biasing members 182, 184 may have different lengths depending on the parameters of the valve 110, support surfaces 142, 144, and distance for compression before the valve 110 is sealed. For instance, the first biasing member 182 may be longer when in the uncompressed, natural state than the second biasing member 184. The first biasing member 182 may range from 10-15 mm, and preferably about 12.5 mm in uncompressed length in certain embodiments. The second biasing member 184 may range from 7-12 mm, and preferably about 9.5 mm in uncompressed length in certain embodiments.

The first and second biasing members 182, 184 may have any number of coils, which may or may not correlate to the length of the biasing members 182, 184. For instance, in at least one embodiment the first biasing member 182 may have 4-10 coils, preferably at least 5 coils, including at least 3 active coils. The second biasing member 184 may have from 3-8 coils, preferably about 4 coils, including at least 2 active coils. The coils may be of any length, such as having a distance in the range of 1-5 mm between each coil, determined by the overall length of the biasing member and number of coils therein. The coils may be right-handed or left-handed coils, and the first and second biasing members 182, 184 may have the same or different handed coils. In at least one embodiment, the first and second biasing members 182, 184 have oppositely handed coils from one another, with one being right-handed coiled and the other being left-handed, though this is not required. Using different handed coils may aid in keeping the biasing members 182, 184 from intertwining or interfering with one another.

One biasing member, such as the first biasing member 182, may have a smaller overall diameter than the second biasing member 184, though in certain embodiments it may be the reverse, and in still other embodiments the first and second biasing members 182, 184 may have the same or similar overall diameter. For instance, the first biasing member 182 may have an overall diameter in the range of 3-8 mm and preferably about 5.5 mm in at least one embodiment. The second biasing member 184 may have an overall diameter in the range of 5-10 mm and preferably about 7.6 mm in at least one embodiment. As used herein, "overall diameter" refers to the diameter of the biasing member when viewed looking down the coils. The first biasing member 182 may be made of wire having a smaller diameter than that of the second biasing member 184, such that the material comprising the first biasing member 182 is thinner than the material comprising the second biasing member 184. For instance, the first biasing member 182 may have a wire diameter in the range of 0.1-0.5 mm and may be about 0.25 mm in at least one embodiment. The second biasing member 184 may have a wire diameter in the range of 0.3-1.0 mm and may be about 0.55 mm in at least one embodiment. Although the term "wire" is used here for ease of reference, it should be understood that this refers to any material forming the biasing members, which may not be wire per se. In other embodiments, the first and second biasing members 182, 184 may be made of material having the same or substantially similar wire diameter as one another.

In at least one embodiment, the first biasing member 182 may be generally longer than the second biasing member 184, and the second biasing member 184 may have a higher spring rate or tension than the first biasing member 182. In other embodiments, these aspects may be reversed, with the first biasing member 182 being shorter and having a greater spring rate than the second biasing member 184. In embodiments having only a single biasing member, a first end may have a higher spring rate than a second end such that different force components are produced when different sections are compressed.

Regardless of the particular specifications of each biasing member(s) 182, 184, the first and second force components are additive as the biasing member(s) 182, 184 are compressed. These additive resistive forces collectively are sufficient to overcome the frictional forces of the seal formed in the closed position, discussed in greater detail below in relation to FIGS. 13-17. As used herein, "spring force" refers to the amount of force provided by the biasing members 182, 184 against the surfaces on which they contact or are biased, such as against the restricting member 170 discussed in detail below. The spring force can also be defined as the spring rate of the biasing member multiplied by its compression.

The biasing members 182, 184 may be positioned anywhere in the valve 110, though in at least one embodiment are dimensioned to fit within the channel 115, such as in the lower body 130 of the valve 110. The channel 115 may include at least one support surface against which the biasing member(s) 182, 184 are supported during compression. For instance, and with reference to FIG. 5, the channel 115 may include a first support surface 142 and second support surface 144 having different dimensions from one another, as previously discussed. Each of these support members 142, 144 may be configured to contact and engage a different one of the biasing members 182, 184 in the channel 115. For instance, the first support surface 142 may be configured to receive, contact and support one end of the first biasing member 182 when it is compressed, which in the example shown in the Figures has the smaller diameter and longer length of the biasing members. The first support surface 142 may therefore have a radial length substantially the same as or slightly larger than the wire diameter of the first biasing member 182. Similarly, the second support surface 144 may be configured to receive, contact and support one end of the second biasing member 184, which in the example shown in the Figures has the larger diameter and shorter length. The second support surface 144 may have a radial length substantially the same as or slightly larger than the wire diameter of the second biasing member 184. In some embodiments, the first and second support surfaces 142, 144 may have the same radial lengths as one another. The support surfaces 142, 144 not only provide a backstop for the biasing members 182, 184 against which they are compressed, but may also keep the biasing members 182, 184 from intersecting or getting tangled in one another.

The valve 110 also includes a restricting member 170 disposed in and movable within the channel 115 along the valve axis 114 to open and close the flow of fluid through the valve 110. The restricting member 170 may be made of the same or different material as that of the valve 110, such as but not limited to nylon, plastics or metals. The restricting member may be a piston, the ball of a ball valve, or other similar component of any type of valve.

Figure 7:
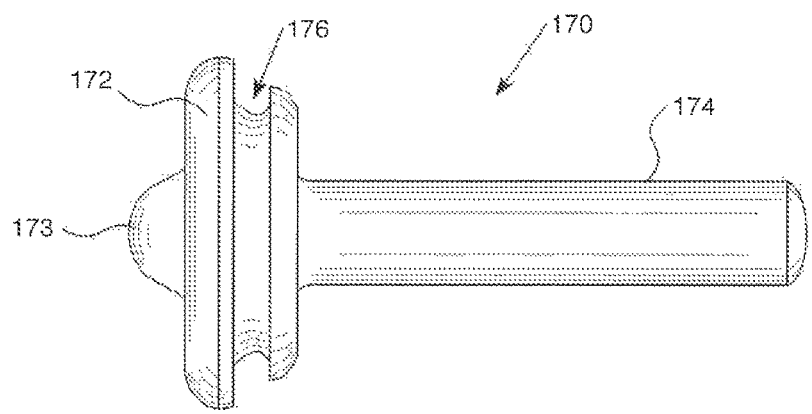
FIG. 7 is a side elevation view of the piston of the valve.
Figure 8:
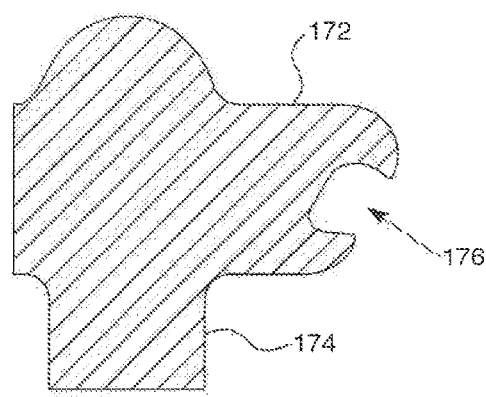
FIG. 8 is a cross-sectional view of the head of FIG. 7.

As shown in FIGS. 4, 7 and 8, the restricting member 170 may be a piston and include a head 172 and a stem 174 extending therefrom. In some embodiments, the head 172 and stem 174 are fixedly secured to one another, such as through bonding, adhesive, or other fastening mechanism. In at least one embodiment, the head 172 and stem 174 may be integrally formed of unitary construction. The stem 174 has a diameter less than that of the channel 115 such that it is received within the channel 115, even at its narrowest or smallest diameter. For instance, in at least one embodiment the stem 174 has a diameter about 1-10 mm and about 4 mm in at least one embodiment. The restricting member 170 is positioned within the channel 115 with the end of the stem 174 being closer to the first end 111 of the valve 110 and the head 172 being closer to the second end 112 of the valve 110. The restricting member 170 is movable within the channel 115 along the valve axis 114, such as by sliding or other action, according to various pressures that are described in greater detail below. When the valve 110 is open, the restricting member 170 may spaced apart from the walls of the channel 115 and/or the angled wall(s) 141 of the neck 140 so as not to engage the walls and to move freely through the channel 115.

The biasing member(s) 182, 184 are positioned so as to be selectively engaged and compressed by the restricting member 170 when force is applied to the restricting member 170, such as during filling described in greater detail below. In at least one embodiment, as shown in the Figures, the biasing member(s) 182, 184 may be positioned between the restricting member 170 and the wall(s) of the channel 115. As depicted in embodiment of FIG. 6, the first and second biasing members 182, 184 may be positioned along the stem 174 of the restricting member 170, such as concentrically about the stem 174, although other configurations are also possible. The first and second biasing members 182, 184 do not interfere with the movement of the stem 174, and nor does the stem 174 impede the compression or relaxation of the biasing members 182, 184. Each act independently of the others.

In some embodiments, the head 172 of the restricting member 170 may have a larger diameter than the stem 174, such as shown in FIGS. 7 and 8, to retain the restricting member 170 within the channel 115 and prevent it from falling through. For instance, in at least one embodiment the stem 174 may have a diameter of about 4 mm and the head 172 may have a diameter of about 13.7 mm. In certain embodiments, the head 172 may have an angled profile such as along the side of the head 172. The pitch or angle of the head 172 may correspond to the pitch or angle of the angled wall(s) 141 of the neck 140 of the channel 115. For instance, the pitch or angle of the side of the head 172 may be in the range of 10° to 80° and may be about 30° in at least one embodiment. It should be appreciated that tolerances or variations in the precise pitch or angle between the angle of the head 172 and the angled wall(s) 141 of the neck 140 are permissible and may still be considered corresponding to one another. Accordingly, the head 172 may fit within and be retained by the neck 140 of the channel 115, such that the angled wall(s) 141 of the neck 140 restrict movement of the restricting member 170 along the valve axis 114 in the direction of the first end 111 of the valve 110.

With reference to FIG. 16, a sealing point 190 is located along the channel 115 length, preferably at some point along the neck 140. The precise location of the sealing point 190 is a matter of design choice as would be within the ambit of one skilled in the art and may be based at least in part on the parameters and dimensions of the various components of the valve 110 and/or valve assembly 100. The sealing point 190 is the point at which a portion of the restricting member 170, such as the head 172 thereof, contacts the angled wall(s) 141 of the neck 140, forming a sealing engagement with the angled wall(s) 141 of the neck 140. This contact may be a frictional engagement between the restricting member 170 and the angled wall(s) 141 of the neck 140 which restricts fluid flow. Accordingly, the sealing point 190 defines the closed position of the valve 110. For example, in the embodiments where the restricting member 170 is a piston, when the side of the head 174 is frictionally fit with the angled wall(s) 141 of the neck 140 of the channel 115, the valve 110 is closed, restricting fluid flow. When there is space between the head 174 and the walls of the neck 140, the valve 110 is open and fluid flow is permitted. Accordingly, fluid flows through the channel 115 and around the restricting member 170 when in use.

In certain embodiments, the restricting member 170, such as the head 172 of a piston, may include a groove 176 formed therein, preferably circumferentially about the head 172 though other configurations are also contemplated, including longitudinal or angled linear grooves. Regardless of configuration, the groove 176 is dimensioned to receive and retain a resilient member 178, such as an O-ring or other sealing component, which can have any suitable shape that assists in forming a fluid tight seal with the walls 141 of the channel neck 140. With reference to FIGS. 4, 7 and 8, the groove 176 may include at least one wall, such as a back, top and bottom walls, which collectively form and define the groove 176. The back, top and bottom of the groove 176 may be continuous with one another, forming a single wall, which may be continuous with the perimeter of the remainder of the head 172, creating an opening therewith. In some embodiments, as shown in FIG. 8, the groove 176 may be asymmetrical in shape, with one side or wall being longer than another, although in other embodiments the groove 176 may be symmetrical. The interior surfaces or walls of the groove 176 may be curved, angled, linear, or other configuration as may be appropriate for receiving a resilient member 178 therein. The groove 176 may have any suitable dimension, such as in the range of about 0.5-2 mm deep and 0.5-2 mm tall. In at least one embodiment, the groove 176 may be about 1.4 mm deep and about 1.6 mm tall, with the opening of the groove 176 measuring about 1.6 mm.

The groove 178 is dimensioned to accommodate the expansion of the resilient member 178 radially into the groove 176 upon compression of the resilient member 178 upon the walls 141 of the neck 140 of the channel 115 in forming a fluid-tight seal. The resilient member 178 may therefore at least partially extend beyond the opening of the groove 176 when retained therein, even when the resilient member 178 is under pressure or compression, so as to be able to form a seal with the angled wall(s) 141 of the neck 140. The resilient member 178 may be made of any suitable elastomeric material, such as but not limited to epichlorohydrin (ECO) such as of the HYDRIN® brand provided by Zeon Chemicals, L.P (Louisville, Ky.), nitrile, silicone, neoprene, polytetrafluoroethylene (PTFE), rubber and elastomeric polymers, and which may be natural or synthetic. The resilient member 178 may have any suitable elastomeric qualities for compression and resiliency, such as may be demonstrated by a hardness or durometer in the range of about 85-95 on the Shore A scale about 90 in at least one embodiment, though the hardness or durometer may be measured on any appropriate scale. The resilient member 178 may have any thickness suitable to provide the required elastomeric qualities for the type of material used. For instance, it may have a thickness in the range of about 0.5-3 mm and about 1.78 mm in at least one embodiment. The resilient member 178 has a diameter sufficient to fit within the groove 176 of the head 172 of the restricting member 170. For instance, the resilient member 178 may have an inner diameter in the range of 8-10 mm and about 9.25 mm in at least one embodiment, and an outer diameter in the range of about 10-15 mm and about 12.8 mm in at least one embodiment.

In addition, the opening of the groove 176 located in the perimeter of the restricting member 170 may be substantially planar with the perimeter thereof, including any angle or pitch, such as of the head 172 shown in FIG. 8. Accordingly, the opening of the groove 176 may be at an angle relative to the valve axis 114 and may correlate to the angle of the neck 140 of the channel 115 in order to provide a fluid-tight seal with the angled walls 141 of the neck 140 and retain the resilient member 178 therein. The diameter of the head 172 may therefore vary and may be larger on one side of the groove 176 and smaller on the other side of the groove 176, such as about 13.7 mm on one side and about 10.5 mm on the other side of the groove 176. In at least one embodiment, the smaller diameter portion of the head 172 is proximal to the stem 174, to follow the narrowing of the channel 115 at the neck 140.

In at least one embodiment, the head 172 may also include an extension 173 which projects from the head 172 opposite from the stem 174, such as shown in FIG. 7. The extension 173 may be a nub or other small structure which extends beyond a substantially planar surface of the head 172. The extension 173 may be linear, curved or angled. It may extend beyond the head 172 by any suitable length to engage the upper body 120 of the valve 110, as described below, to restrict the movement of the restricting member 170 along the valve axis 114 in the direction of the second end 112. For instance, in some embodiments the extension 173 may extend in the range of 2-3 mm from the surface of the head 172 and may be about 2.2 mm in at least one embodiment. Further, in at least one embodiment, the extension 173 may have any width or diameter that would fit within the channel 115, such as in the range of about 3-8 mm and about 5 mm in at least one embodiment. In some embodiments, the extension 173 may have a similar width to the diameter of the stem 174, though this relationship is not required in all embodiments.

Figure 9:
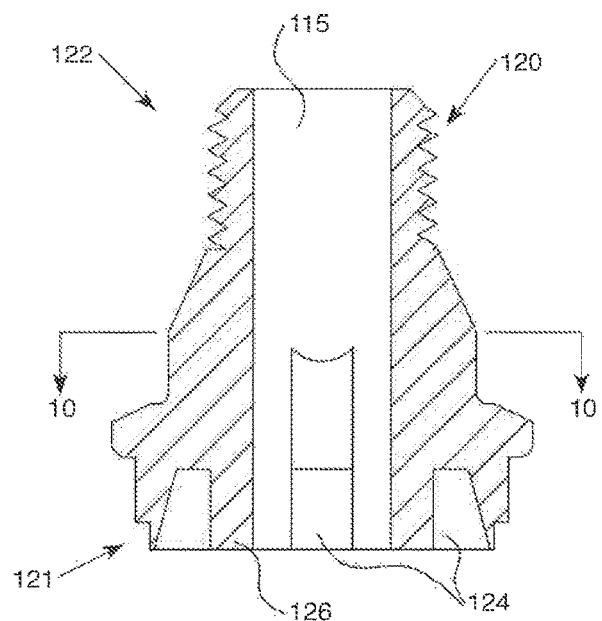
FIG. 9 is a cross-sectional view of the upper body of the valve shown along the valve axis.
Figure 10:
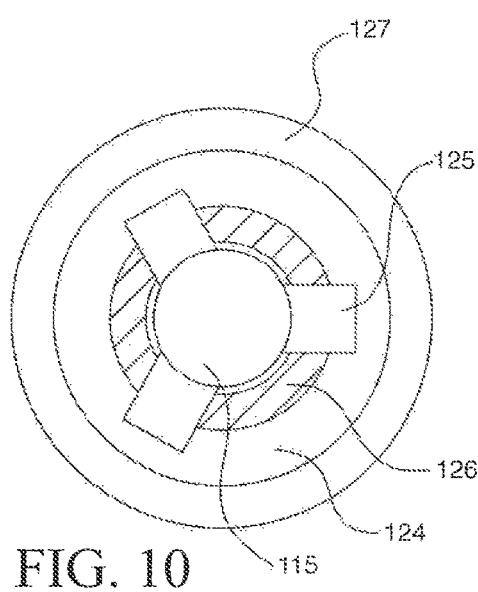
FIG. 10 is a top cross-sectional view of upper body of FIG. 9 shown along line 10-10.

As shown in FIGS. 4, 9 and 10, the valve 110 also includes an upper body 120 forming the second end 112 of the valve 110 and configured to engage the lower body 130. The upper body 120 may be made of the same or different material as that of the lower body 130, as noted above. The upper body 120 itself has a first end 121 and opposite second end 122 and a length defined there between. The length may be any suitable measurement, such as in the range of 18-40 mm and about 20.5 mm in at least one embodiment. As shown in FIGS. 1-3, 9, 11 and 12, the second end 122 of the upper body 120 may include threading or other suitable frictional or joining features that allows the upper body 120 to connect to a filling apparatus 12, fluid source, or other mechanism at the top of fluid storage container 10 for filling and discharging the fluid storage container 10. The first end 121 of the upper body 120 is configured to engage the second end 132 of the lower body 130 to collectively form the body of the valve 110. For instance, in at least one embodiment the upper body 120 and lower body 130 securely attach to one another with welding, adhesive, threading engagement or other suitable secure fastening mechanism. Accordingly, at least a portion of the upper body 120 may have a substantially similar diameter to the lower body 130 described above, such as the first end 121 of the upper body 120. For instance, in at least one embodiment the first end 121 of the upper body 120 may have a diameter in the range of 15-17 mm and about 16 mm in at least one embodiment.

In at least one embodiment, the first end 121 of the upper body 120 may be received within the second end 132 of the lower body 130 when connecting to two together to form the valve 110. In still other embodiments, the second end 132 of the lower body 130 may include an interior notch or other radially inwardly facing feature configured to receive and restrain the first end 121 of the upper body 120. Of course, the upper and lower bodies 120, 130 may be joined together in other ways, such as with the second end 132 of the lower body 130 may be received within the first end 121 of the upper body 120. Once joined, the upper and lower bodies 120, 130 may be permanently affixed to one another through welding, adhesives or other suitable methods.

The valve channel 115 extends through the upper body 120 between the first and second ends 121, 122 thereof. The channel 115 forms a continuous fluid flow pathway between the upper and lower bodies 120, 130 of the valve 110 when joined together. Accordingly, the channel 115 at the first end 121 of the upper body 120 may have a similar diameter as the channel 115 at the second end 132 of the lower body 130, such as about 16 mm in at least one embodiment. In other embodiments, the channel 115 extending through the upper body 120 may have a smaller diameter than the channel 115 in the lower body 130, such as about 6 mm for instance.

In certain embodiments, such as depicted in FIG. 10, the upper body 120 also includes an annular channel 124 disposed circumferentially within the upper body 120. The annular channel 124 may be located anywhere in the upper body 120, though preferably is located at the first end 121 of the upper body 120. The annular channel 124 may be concentrically positioned about the channel 115 in the upper body 120, as shown in FIG. 10. The annular channel 124 is in fluid flow communication with the channel 115 in both the upper and lower bodies 120, 130. Accordingly, the annular channel 124 provides fluid flow to outer, such as perimetric, areas of the valve 110, directing fluid around the head 172 so the restricting member 170 does not obstruct the flow of fluid through the valve 110 in the open position. The outer diameter of the annular channel 124 may be substantially the same diameter as the diameter of the channel 115 in the lower body 130, such as about 16 mm in at least one embodiment.

Connecting the annular channel 124 with the main channel 115 is at least one passage 125, as shown in FIG. 10. The passage(s) 125 are therefore in fluid communication between the central channel 115 and annular channel 124 and provide fluid flow between the channels 115, 124. There may be any number of passages 125 and they may have any shape and dimension sufficient to provide fluid flow between the channel 115 and the annular channel 124. For instance, as in the embodiment of FIGS. 9 and 10, there may be three passages 125 evenly spaced around the main channel 115, though in other embodiments there may be two, six, eight, or any number. In still further embodiments, the passages 125 may be the same as one another, and in other embodiments may be different from one another in geometry and/or shape. For instance, the passages 125 may be triangular in shape as in FIG. 9, angling outward from the main channel 115 to the annular channel 124. In other embodiments, the passages 125 may be curved, linear, jointed, or other configuration. In at least one embodiment, the passage(s) 125 may be angled in the range of 10° to 80° relative to the valve axis 114. In certain embodiments, the passage(s) 125 may be angled about 60° relative to the valve axis 114, as in FIGS. 9-10. In some embodiments, the upper body 120 includes only a central channel 115 and at least one passage 125 but lacks an annular channel 124 as described above. In such embodiments, the passage(s) 125 may direct fluid around the restricting member 170 directly.

The upper body 120 may also include any number of legs 126 disposed between the annular channel 124 and the central or main channel 115. The legs 126 may also be positioned between adjacent ones of the passages 125, such as to separate one passage 125 from the next, as shown in FIG. 10. The legs 126 may preferably be formed of unitary construction with the upper body 120 and may therefore be formed of the same material. In at least one embodiment, the legs 126 do not extend beyond the perimeter of the first end 121 of the upper body 120, such that the opening at the first end 121 of the upper body 120 remains flush or substantially planar, as shown in FIG. 9. In other embodiments, however, the legs 126 may extend beyond the perimeter of the first end 121 or may remain within the upper body 120. Regardless of length, the legs 126 prevent movement of the restricting member 170 in the direction of the second end 112 of the valve 110 along the valve axis 114. When the valve 110 is fully assembled, such as shown in FIGS. 13-17, the restricting member 170 is positioned and movable within the lower body 130 of the valve 110, with the extension 173 of the head 172 protruding into the central channel 115 of the upper body 120. Because the annular channel 124 is also located at the junction of the upper and lower bodies 120, 130, the head 172 may be able to travel up into and block the annular channel 124 as well, but for the legs 126 that restrict movement of the head 172 and prevent it from entering the annular channel 124. Accordingly, fluid flow from the annular channel 124 around the restricting member 170 is maintained even when the head 172 is at its upper-most limit within the valve 110.

With reference to FIGS. 1-4, the valve 110 may also include a clip 136 that extends from the exterior of the valve 110. In at least one embodiment, the clip 136 may extend from the exterior of the valve 110 in the range of 1-4 mm and may be about 3 mm in certain embodiments. The clip 136 is dimensioned to receive and releasably retain one or more dip tube, wire, cable, cord, or the like as may be positioned along the length of valve 110 and beyond into the fluid storage container 10, such as to obtain readings of the interior of the container 10 or fluid contained therein such as but not limited to fluid level, temperature and pressure. The clip 136 may therefore have lobes, such as shown in FIGS. 1 and 4, that coordinate together to hold the dip tube, wire, cable, or cord. The clip 136 may be located anywhere along the valve 110 exterior, such as near the first end 111 of the valve 110. In some embodiments, the clip 136 may be located on the lower body 130 of the valve 110.

The first end 111 of the valve 110 also includes a receiver 139 formed in the lower body 130 of the valve 110. As shown in FIGS. 1-4, the receiver 139 may be an exterior-facing socket, slot or similar structure that is closed on one side and open on at least one other side and does not interfere with the channel 115 on the inside of the valve 110. As shown in FIGS. 1-4, the receiver 139 may be open on three sides which are contiguous with one another. The receiver 139 is dimensioned to receive and movably retain a cam 150 therein. The receiver 139 may therefore have a length in the range of 15 to 17 mm, a width in the range of 4 to 19 mm, and a depth in the range of 5 to 8 mm. In at least one embodiment, the receiver 139 measures about 16 mm long by about 17 mm wide by about 6 mm deep.

The lower body 130 of the valve 110 may also include an attachment opening 138 extending through a portion of the lower body 130 at the receiver 139. The attachment opening 138 is dimensioned to receive an attachment member 137 therethrough. For instance, the attachment opening 138 may have a diameter in the range of 1-3 mm and may be about 2.5 mm in certain embodiments. The attachment member 137 may be a pin, screw, bolt, or other similar fastener. The attachment member 137 is configured to pass through the attachment opening 138 and a cam opening 151 within the cam 150 when the cam 150 is positioned within the receiver 139 (as described in more detail below). The attachment member 137 may therefore be at least long enough to span a portion of the cam 150 and a portion of the attachment opening 138. In certain embodiments, the attachment member 137 may be as long as the depth of the cam 150 and at least a portion of the lower body 130 and may not extend beyond the lower body 130, such as when flush with the surface of the lower body 130 or when countersunk in the attachment opening 138. For instance, in at least one embodiment the attachment member 137 may measure about 12-13 mm long, such as about 12.7 mm in certain embodiments, and may have a diameter in the range of about 2-3 mm such as about 2.4 mm in certain embodiments. In other embodiments, however, the attachment member 137 may extend beyond the lower body 130 so long as it does not impede the movement of the cam 150.

In some embodiments, the attachment member 137 may include at least one frictional element such as spurs, fins, threads, flanges, grooves, or other similar components extending radially outwardly or inwardly from the attachment member 137, and which may be angled, pitched, or curved. The frictional element(s) need only minimally extend into the attachment opening 138, enough to grab the surrounding material without interfering with the rotation of the cam 150. Such frictional elements are configured to engage at least one of the cam 150 and the lower body 130 near the attachment opening 138 to frictionally retain the attachment member 137 within the cam 150 and valve 110, but not interfering with the movement or rotation of the cam 150. In at least one embodiment, the frictional element(s) may have a polarity in their configuration and/or position along the attachment member 137 to aid in placement and positioning of the attachment member 137. For instance, in at least one embodiment, the attachment member 137 may include four frictional elements formed as fins positioned along one-quarter of the length of the attachment member 137 and angling outwardly therefrom to an ultimate length of about 0.2 mm. This is but one embodiment and is not intended to be limiting in any way. There may be any number of frictional elements and may be positioned anywhere along the attachment member 137.

Referring to FIGS. 1-4, a check valve assembly 100 includes the valve 110 as discussed above as well as a cam 150 pivotably mounted in the receiver 139 of the valve 110 by the attachment member 137. Accordingly, the attachment member 137 serves as a pivot point about which the cam 150 rotates. The cam 150 may have any thickness as would fit within the receiver 139 of the valve 110. For instance, in at least one embodiment the cam 150 has a thickness in the range of 3-6 mm and is about 5 mm in at least one embodiment. As discussed above, the cam 150 is inserted into the receiver 139 so a central opening of the cam 150 aligns with the attachment opening 138 of the receiver 139, and the attachment member 137 is inserted through both to connect the cam 150 and lower body 130 of the valve 110 together while permitting pivoting movement of the cam 150 about the attachment member 157.

The cam 150 includes a cam profile, as best shown in FIGS. 15 and 16. The cam profile is the perimetric boundary of the cam 150 and includes a variety of features that affect the movement of the portion of the restricting member 170 contacting it, such as a piston stem 174. For instance, the cam 150 includes a cam lobe 152 having a preferably smooth or rounded surface for receiving and supporting at least a portion of the restricting member 170, such as a terminal end thereof which may be a stem 174, as shown in FIGS. 14 and 15. The apex of the cam lobe 152 defines a shoulder 153 that may be higher than the cam lobe 152 and which may be pointed, rounded, or another configuration. The cam 150 further includes a cam valley 154 defined as the space bounded by the valley floor 157 and opposing first and second cam walls 155, 156 that extend from the valley floor 157. Accordingly, the depth of the cam valley 154 depends on the height of at least one of the cam walls 155, 156. The first cam wall 155 joins the shoulder 153 to the valley floor 157 and therefore defines the height/depth of the cam valley 154 in at least one embodiment. For instance, in at least one embodiment, the first cam wall 155 may have a radius of about 10.5 mm from the ordinal center (or pivot point), and the cam valley 154 may be defined by a valley floor 157 having a radius of about 5 mm from the same pivot point. The difference between these is about 5.5 mm, which is the depth of the cam valley 154 at that location along the cam profile. The cam valley 154 has a depth or height sufficient to receive the stem 174, preferably without the stem 174 contacting the valley floor 157. The first cam wall 155 and second cam wall 156 may be linear, curved or angular, and may be parallel to one another. In other embodiments, the first and second cam walls 155, 156 may extend at different angles relative to the valley floor 157, and the angle of the second cam wall 156 may be greater than the angle of the first cam wall 155 in at least one embodiment. For instance, the second cam wall 156 may be at a point of the cam profile having a radius of about 7.75 mm from the pivot point of the cam 150, such that the first cam wall 155 is higher than the second cam wall 156 by about 2.75 mm. Further, the second cam wall 156 may extend at substantially a right angle to the cam valley floor 157 and the first cam wall 155 may extend at an acute or obtuse angle relative to the cam valley floor 157, but preferably at an obtuse angle thereto. Of course, the second cam wall 156 may also extend at an acute or obtuse angle relative to the cam valley floor 157 and may be the same or different angle as that of the first cam wall 155. The top of the second cam wall 156 also limits the rotation of the cam 150 in the closed position to prevent it from over-rotating, such as to 180° or more relative to the valve axis 114. A separate wall on the opposite side of the first cam wall 155 prevents over-rotation of the cam 150 in the open position. In addition, the first cam wall 155 and shoulder 153 may be configured such that when the stem 174 of the restricting member 170 moves past the shoulder 153 and into the cam valley 154, the stem 174 is spaced apart from the first cam wall 155. In other embodiments, the stem 174 may contact and frictionally engage the first cam wall 155 when in the cam valley 154.

Returning to FIGS. 1-4, an arm 160 extends from the cam 150 and may be securely attached or integrally formed therewith. In at least one embodiment the arm 160 may be made of material such as but not limited to nylon (unfilled, glass-filled, and other types of nylon), plastics, metals, stainless steel and other suitable materials. The arm 160, cam 150, and/or upper and lower bodies 120, 130 of the valve 110 may be made of the same or different materials. The arm 160 and cam 150 may be of unitary construction or made separately and securely fastened to one another. The arm 160 may be any length that would fit within the fluid storage container 10, such as in the range of 100-130 mm and about 110 mm in at least one embodiment. The arm 160 defines an arm axis 166 that is transverse to the valve axis 114 such that the axes intersect one another, as shown in FIG. 4.

The arm 160 includes a float 162 disposed along at least a portion thereof. In some embodiments the float 162 spans a majority of the length of the arm 160. For instance, the arm 160 may measure about 110 mm and the float 162 may measure in the range of 75-80 mm in length. The float 162 may be made of a material that lighter than the fluid 11 to be filled, stored and discharged from the fluid storage container 10 so that it floats thereon. For instance, in at least one embodiment the float 162 may be made of material that has a lower density than that of the fluid 11, such as up to 0.5 grams per cc unit of fluid 11. In certain embodiments, the float 162 has a density of about 0.32 g/cc of fluid 11. In some embodiments, the float 162 may include a plurality of air pockets to facilitate a floating action on the surface of the fluid 11. Accordingly, the float 162 may be made of materials compatible with the fluid it is intended to be in contact with to avoid dissolving, such as but not limited to foam, hard nitrophenolic NMR foam, polystyrene, and other similar materials. The float 162 may be secured to the arm 160 with a cap 164, such as a nut, washer, wingnut, or other similar fastening mechanism, and/or may be permanently secured to the arm 160 such as with welding or adhesive. The arm 160 may also include threading or other features to engage the cap 164 and releasably retain the cap 164 on the arm 160, such as at the terminal end thereof.

As shown in FIG. 11, the check valve assembly 100 may be mounted within an interior of a fluid storage container 10, such as a tank or other similar structure. For instance, the fluid storage container 10 may be a 10 lb. or 20 lb. propane cylinder or other similar canister for holding liquids or gases. The first end 111 of the valve 110 and the arm 160 extends into the interior space of the fluid storage container 10. The second end 112 of the valve 110 may attach to a filling apparatus 12 or other like structure attached to an access port 13 to provide selective fluid communication between the access port 13 of the container 10 and the valve 110. The access port 13 may in turn be connected to a fluid source for filling the fluid storage container 10. Larger sizes of the cam 150, cam profile, cam valley 154 and arm 160 length may be used with larger fluid storage containers 10, and vice versa, and may be scalable or proportional in relation to one another. In at least one embodiment, however, the valve 110 size may remain unchanged regardless of the size of fluid storage container 10 used. In other embodiments, the valve 110 may also be larger or smaller for different sized fluid storage containers 10 with differing holding capacities.

In an open or resting position as shown in FIGS. 11 and 13, which may also be the same as a discharging position, the arm 160 of the check valve assembly 100 extends downwardly into the interior space of the fluid storage container 10 by an angle A1. Angle A1 is measured from the horizontal to the arm axis 166 and is the maximum angle at which the arm 160 may be positioned. It occurs when the float 162 is not in contact with the fluid 11 within the container 10. Angle A1 may depend on the contours of the cam 150 and the dimensions and capacity of the container 10. In at least one embodiment, angle A1 may be in the range of 90° to 45° relative to the horizontal, and in at least one embodiment may be about 55-56°. Taking a closer look at the inside of the valve 110, as shown in FIG. 13, in the open or resting position, the head 172 of the restricting member 170 may be contacting the upper body 120 of the valve 110, and the terminal end of the stem 174 may be free from contact with the cam 150. The pathway through the channel 115 is clear and the biasing member(s) 182, 184 are relaxed and uncompressed.

To begin filling the container 10 with fluid 11, a fluid source is attached to the access port 13. The handle 14 of the filling apparatus 12, as shown in FIG. 11, is operated such as by turning, rotating, depressing, sliding, or other suitable action to open the filling apparatus 12, allowing fluid 11 to enter from a fluid source (not shown) through the access port 13. The fluid 11 passes through the filling apparatus 12, into the second end 112 of the valve, through the channel 115 of the valve 110, and out the fluid opening(s) 135 in the valve 110 (shown in FIGS. 1-3). FIG. 14 shows the fluid flow 16 of fluid through the valve 110 during filling. As the fluid 11 flows down through the valve 110 from the filling apparatus 12, it applies a fluid force 20 onto the restricting member 170, such as a piston head 172, in the direction of fluid flow 16, which is in the direction of the first end 111 of the valve 110. The fluid force 20 pushes the restricting member 170 in the direction of fluid flow 16, which goes through the channel 115, passage(s) 125 and annular channel 124 and around the restricting member 170. The restricting member 170 is thus moved out of contact with the upper body 120 of the valve 110, and into contact with the cam 150. Specifically, the terminal end of the stem 174 is moved into contact with the cam lobe 152 of the cam 150. This cam lobe 152 provides sufficient height for the stem 174 to keep the restricting member 170 elevated from the walls of the neck 140.

In addition, the fluid force 20 begins to compress the first biasing member 182 against the first support surface 142, creating a corresponding first force component against the restricting member 170. As depicted in FIG. 14, there is a first compression zone 186 in proximity to the restricting member 170. Without wishing to be bound by theory, the first compression zone 186 is defined by the top and bottom boundaries of the portion of the restricting member 170 that is responsible for forming a seal at the sealing point 190 in relation to the compression of the first biasing member 182. It should therefore be appreciated that the first compression zone 186 is a region defined by the upper boundary of the restricting member 170, such as the piston head 172, and the lower end thereof, in its position from just contacting the first biasing member 182 without compression (as an upper boundary) through its range of motion in compressing the first biasing member 182 (the lower boundary). Accordingly, in at least one embodiment, the first compression zone 186 may be located in the channel 115 at or near the sealing point 190.

As the fluid storage container 10 begins to fill, the level of fluid 11 accumulated therein begins to rise. When the level of fluid 11 reaches the float 162 on the arm 160, the float 162 also begins to rise with the rising level of fluid 11. This contact of the fluid 11 with the float 162 marks the transition positions. As the fluid 11 level rises and the float 162 rises through various transition positions, the attached arm 160 and cam 150 rotate about the attachment member 137 as a pivot point, thus reducing the angle of the arm axis 166 from the angle A1. As the cam 150 rotates, as shown in FIG. 15, the stem 174 rides along cam lobe 152 to the cam shoulder 153. The channel 115 remains open in these transition positions, allowing fluid 11 to continue flowing through the valve 110 and into the container 10. With the continued fluid flow 16 comes added fluid force 20 on the restricting member 170, thus further compressing the first biasing member 182 through the first compression zone 186 and beginning to compress the second biasing member 184 in a second compression zone 188. Like the first compression zone 186, the second compression zone 188 is also defined by the upper and lower boundaries of the portion of the restricting member 170 that will eventually form the sealing engagement that closes the valve 110, such as a piston head 172, but in relation to the second biasing member 184 rather than the first. The second compression zone 188 therefore begins when the restricting member 170 comes into contact with the second biasing member 184 and continues through the range of compression of the second biasing member 184. The first and second compression zones 186, 188 may overlap with one another or may be discrete from one another. The first and second force components may be additive with one another, providing increased resistive force with the addition and/or transition to compression of the second biasing member 184. This increase in resistive force may be a linear increase or non-linear increase, such as step-wise or exponential, and may be determined by the resistive properties or other physical properties of the biasing members 182, 184.

As the restricting member 170 compresses the second biasing member 184, the biasing member 184 in turn produces a resultant second force component that pushes against the restricting member 170. In at least one embodiment, the second biasing member 184 has properties that produce a second force component which may have a greater force than the first force component produced by the first biasing member 182. For instance, the second biasing member 184 may have a greater spring rate or stiffness that produces greater force when compressed than the first biasing member 182. In other embodiments, though, the second force component may be the same or less than the first force component.

The second compression zone 188 is preferably closer in proximity to the sealing point 190 than the first compression zone 188 such that the first and second force components are additive with one another to increase the resistive force on the restricting member 170 the closer it gets to the sealing point 190. As the restricting member 170 approaches the sealing point 190, the space in the channel 115 in which the fluid may flow becomes smaller, increasing the force of the fluid flow 16 on the restricting member 170. Because of this increased fluid force, the restricting member 170 is able to apply increased force to the second biasing member 184. Because of this greater fluid force, the second biasing member 184 having more resistive properties is capable of being compressed whereas it may not be able to be compressed by the initial fluid force.

When the float 162 rises to a level that is determined to be the maximum fill level for the container 10, the arm 160 and arm axis 166 are at an angle A2, shown in FIG. 12. Angle A2 is defined as the angle of the arm axis 166 relative to the horizontal when the maximum fluid level is reached. In some embodiments, the maximum fill level may be about 75%-90% of total container 10 capacity and may be about 80% full in at least one embodiment. The corresponding angle A2 of the arm 160 at maximum fill may be in the range of 40° to 0° relative to the horizontal and may be 19-20° in at least one embodiment. In any event, angle A2 is less than angle A1. When the arm 160 achieves angle A2, the cam 150 is sufficiently rotated that the stem 174 falls or drops off the cam shoulder 153, as depicted in FIG. 16. The pressure or fluid force 20 of the incoming fluid continues to press on the restricting member 170, driving the stem 174 down into the cam valley 154. Simultaneously, the fluid force 20 further compresses the first and second biasing member 182, 184 in the first and/or second compression zones 186, 188.

In at least one embodiment, the downward movement of the restricting member 170 is halted by the head 172 and/or resilient member 178 contacting the angled walls 141 of the neck 140 of the channel 115 at the sealing point 190, as shown in FIG. 16. The precise location of the sealing point 190 is a matter of design choice as would be within the ambit of one skilled in the art to determine, and may be located anywhere along the channel 115, preferably anywhere along the angled wall(s) 141 of the neck 140. The increased fluid force caused with greater proximity of the restricting member 170 to the sealing point 190, along with the greater second force component from the second biasing member 184, provides a tighter seal at the sealing point 190 than in other valves and increased friction at the point where the restricting member 170, such as the piston head 172, contacts the angled wall(s) 141 of the neck 140. Indeed, in at least one embodiment the fluid force 20 may be so great that the head 172 and/or resilient member 178 may be frictionally compressed against the angled walls 141 of the neck 140, tightly wedging or jamming the restricting member 170 into the neck 140 of the channel 115. This contact between the head 172 and/or resilient member 178 and channel neck 115 provides a fluid-tight seal at the sealing point 190, thereby closing the valve 110 and preventing fluid flow past the point of contact. Thus, the valve 110 automatically closes or shuts off.

Preferably, the sealing of the valve 110 occurs substantially simultaneously to the stem 174 falling off the cam shoulder 153 and moving into the cam valley 154. In at least one embodiment, the length of the stem 174 is less than the distance from the neck 140 to the cam valley floor 157 such that the neck 140 stops the downward movement of the restricting member 170 before the stem 174 can contact the cam valley floor 157. In the closed position, the first and second biasing members 182, 184 are at maximum compression between the underside of the head 172 and the first and second support surfaces 142, 144, respectively. The valve 110 remains in this closed position until the pressure above the valve 110 is released.

To use the fluid 11 within the container 10, one must first disconnect the filling apparatus 12 or vent the container 10 such as at the access port 13. This reduces the pressure above (proximate to the second end 112) the valve 110 compared to within the valve 110 and results in an initial discharge, shown in FIG. 17. In some embodiments this pressure differential may be enough to open the valve 110. In at least one embodiment, however, it may not be sufficient to overcome the friction between the head 152 and the walls 141 of the neck 140 at the sealing point 190. Accordingly, the spring force 30 that is at least the second force component, but preferably the first and second force components collectively, may be needed to overcome the frictional engagement. Once the pressure above the valve 110 is reduced from venting or removing the filling apparatus, the spring force 30 that the first and second biasing members 182, 184 exert on the head 172 from the compressed state becomes greater than the pressure on the opposite side of the head 172. While the head 172 is still seated on the angled wall(s) 141 of the neck 140 at the sealing position, both the first and second biasing members 182, 184 push against the head 172 with the combined spring force 30 that is sufficient to overcome the friction of the seal. In some embodiments, the spring force 30 from the first and second biasing members 182,184 may also overcome any friction between the stem 174 against the cam shoulder 173 that may exist. Once the friction of the restricting member 170 within the neck 140 is overcome, the restricting member 170 moves upward in the direction of the spring force 30, opposite the frictional force. The fluid seal is released and the valve 110 is open, allowing fluid flow such as for discharge during use. The first and/or second biasing members 182, 184 may continue to push the restricting member 170 away from the sealing point 190 as far as their respective lengths permit. The pressure of the fluid flow 16 escaping from below may also contribute to the movement of the restricting member 170 upward once the initial friction is overcome.

Having first and second biasing members 182, 184 (or first and second portions of a composite biasing member having different compressive properties) provides certain benefits that are not possible with the current valves. If only one biasing member capable of providing only a single force component were to be used, the biasing member would either be too stiff that it would not compress sufficiently for the valve 110 to close or it would be too light that it could not overcome the frictional forces of the sealing engagement of the restricting member 170 at the sealing point 190. Having two different force components, such as provided by first and second biasing members 182, 184, bridges this gap and solves this problem. The extra force is only added when and where it is needed to provide a tighter, more efficient seal and to similarly overcome the friction providing this tighter seal.

Since many modifications, variations and changes in detail can be made to the described preferred embodiments, it is intended that all matters in the foregoing description and shown in the accompanying drawings be interpreted as illustrative and not in a limiting sense. Thus, the scope of the invention should be determined by the appended claims and their legal equivalents. Now that the invention has been described,

What is claimed is:

1. A check valve having a closed position and an open position, said check valve comprising:
   a channel:
      (i) extending through said valve along a valve axis;
      (ii) defined by at least one wall;
      (iii) including a neck defined by at least one angled wall; and
      (iv) configured to be selectively in communication with a fluid source;
   a sealing point located along said angled wall of said neck;
   a restricting member movable within said channel along said valve axis between:
      (v) said closed position defined by frictional engagement of said restricting member with said angled wall of said neck at said sealing point; and
      (vi) said open position defined by said restricting member being spaced apart from said angled wall of said neck at said sealing point;
   a first biasing member having a first spring rate, said first biasing member selectively engaging said restricting member and providing a first force component in a first compression zone when engaging said restricting member;
   a second biasing member having a second spring rate greater than said first spring rate, said second biasing member selectively engaging said restricting member independently from said first biasing member, said second biasing member providing a second force component in a second compression zone when said second biasing member engages said restricting member,
   said first and second compression zones being within said channel in proximity to said sealing point and said second compression zone being nearer in proximity to said sealing point than said first compression zone,
   said first and second biasing members collectively providing increasing resistive force against said restricting member with increasing proximity of said restricting member to said sealing point as said restricting member moves from said open position to said closed position; and
   said first and second spring rates of said first and second biasing members producing said first and second force components that are collectively sufficient to overcome said frictional engagement of said restricting member with said angled wall at said sealing point in said closed position and move said restricting member from said closed position to said open position.

2. The check valve of claim 1, further comprising at least one support surface associated with said channel, one end of said first and second biasing members positioned against said at least one support surface in said first and second compression zones.

3. The check valve of claim 1, wherein said first force component includes a first range of resistive forces, said second force component includes a second range of resistive forces, and wherein one of: (i) said second range of resistive forces at least partially overlaps said first range of resistive forces, and (ii) said second range of resistive forces is distinct from said first range of resistive forces.

4. The check valve of claim 1, further comprising a first support surface and a second support surface associated with said channel, said first biasing member contacting said first support surface in said first compression zone and said second biasing member contacting said second support surface in said second compression zone.

5. The check valve of claim 4, wherein said first biasing member is longer than said second biasing member.

6. The check valve of claim 4, wherein said first and second biasing members are disposed about at least a portion of said restricting member.

7. The check valve of claim 6, wherein said first and second biasing members are disposed concentrically about at least one of: (i) a portion of said restricting member and (ii) one another.

8. The check valve of claim 1, wherein said restricting member is a piston having a head and a stem extending from said head, wherein said head contacts said at least one angled wall of said neck in said frictional engagement at said sealing point in said closed position.

9. The check valve of claim 8, wherein said head further includes a groove formed therein, said groove dimensioned to receive and retain at least a portion of a resilient member therein, said resilient member configured to contact said at least one angled wall of said neck in said frictional engagement at said sealing point in said closed position.

10. The check valve of claim 8, wherein said at least one biasing member is movably retained within said channel along said stem.

11. The check valve of claim 10, further comprising a first biasing member and a second biasing member each disposed concentrically about said stem.

12. The check valve of claim 1, further comprising at least one fluid opening formed in said valve downstream of said sealing point, said at least one fluid opening being in fluid communication with said channel.

13. A check valve assembly comprising:
a valve as recited in claim 1;
a cam having a cam lobe and cam valley, said cam rotatingly connected to said valve;
an arm including a float configured to float on said fluid, said arm extending from said cam along an arm axis and configured to rotate said cam relative to said valve as said float rises and falls with a level of said fluid;
wherein at least a portion of said restricting member is configured to:
(i) contact said cam lobe when said valve is in said open position;
(ii) move along said cam lobe as said cam rotates; and
(iii) reside in said cam valley when said valve is in said closed position; and
said closed position further being defined by said arm axis forming a predetermined angle relative to the horizontal.

14. The check valve assembly of claim 13, further comprising a receiver formed in one end of said valve, said receiver configured to receive and rotatably retain said cam.

15. The check valve assembly of claim 14, further comprising an attachment member extending through said receiver and said cam, said attachment member forming a pivot point for rotation of said cam.

16. The check valve assembly of claim 13, wherein said cam valley is defined by a valley floor and at least one cam wall forming a side of said cam lobe, wherein said restricting member is spaced apart from said valley floor in said closed position.

17. The check valve assembly of claim 13, wherein said preselected angle is in the range of 40° to 0°.

18. The check valve assembly of claim 17, wherein said preselected angle is about 19° to 20°.

19. A fluid storage container comprising:
an access port in selective fluid communication with a fluid source;
an interior space configured to retain fluid;
a check valve assembly as recited in claim 14 in selective fluid communication with said access port;
said arm of said check valve assembly extending into said interior space of said fluid storage container,
said float configured to rise and fall with said level of said fluid in said fluid storage container; and
wherein said closed position is further defined by said fluid reaching a predetermined fill level.

20. The fluid storage container of claim 19, wherein said predetermined maximum fill level is in the range of 75% to 90% of total capacity of said fluid storage container.

21. The fluid storage container of claim 20, wherein said predetermined maximum fill level is about 85% of total capacity of said fluid storage container.

* * * * *